US007926613B2

(12) United States Patent
Matsuda

(10) Patent No.: US 7,926,613 B2
(45) Date of Patent: Apr. 19, 2011

(54) STEERING SYSTEM FOR VEHICLE

(75) Inventor: Morihiro Matsuda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 386 days.

(21) Appl. No.: 12/066,797

(22) PCT Filed: Sep. 12, 2006

(86) PCT No.: PCT/JP2006/318473
§ 371 (c)(1),
(2), (4) Date: Mar. 13, 2008

(87) PCT Pub. No.: WO2007/032528
PCT Pub. Date: Mar. 22, 2007

(65) Prior Publication Data
US 2009/0283354 A1    Nov. 19, 2009

(30) Foreign Application Priority Data

Sep. 14, 2005    (JP) ................................. 2005-266957

(51) Int. Cl.
*B62D 5/04* (2006.01)
(52) U.S. Cl. .......................... 180/446; 180/443; 180/444
(58) Field of Classification Search .................. 180/443, 180/444, 446
See application file for complete search history.

(56) References Cited

U.S. PATENT DOCUMENTS

| 6,718,242 | B1 * | 4/2004 | Mori et al. | 701/41 |
| 6,763,907 | B2 * | 7/2004 | Ueno et al. | 180/444 |
| 6,782,969 | B2 * | 8/2004 | Kodama et al. | 180/446 |
| 7,004,281 | B2 * | 2/2006 | Hidaka | 180/446 |
| 7,306,535 | B2 * | 12/2007 | Menjak et al. | 475/29 |
| 2004/0193346 | A1 * | 9/2004 | Sugiyama | 701/42 |
| 2005/0039974 | A1 * | 2/2005 | Hidaka | 180/444 |

FOREIGN PATENT DOCUMENTS

| JP | 10 287250 | 10/1998 |
| JP | 2003 320945 | 11/2003 |
| JP | 2005 67284 | 3/2005 |
| JP | 2005 132327 | 5/2005 |
| JP | 2005 162111 | 6/2005 |
| JP | 2005 162124 | 6/2005 |
| JP | 2005 212616 | 8/2005 |
| JP | 2005 225344 | 8/2005 |

* cited by examiner

*Primary Examiner* — Joanne Silbermann
*Assistant Examiner* — Maurice Williams
(74) *Attorney, Agent, or Firm* — Oblon, Spivak, McClelland, Maier & Neustadt, L.L.P.

(57) ABSTRACT

A vehicle steering system including: (a) a steering operation member; (b) a movement-amount variably transmitting device including: (b-1) a housing fixed to a vehicle body; (b-2) a differential mechanism including (i) a first element connected to the steering operation member, (ii) a second element movable relative to the first element, and (iii) a third element engaged with the first and second elements; and (b-3) a drive source for moving the third element, such that an amount of relative movement of the first and second elements is changeable depending on an amount of movement of the third element; and (c) a wheel turning device connected to the second element to turn a vehicle wheel. The movement-amount variably transmitting device further includes (b-4) a third-element-movement inhibiting device for inhibiting movement of the third element. The steering system further includes (d) a third-element-movement inhibition cancelling device for cancelling inhibition of the movement of the third element.

18 Claims, 14 Drawing Sheets

(a)

(b)

STEERING SYSTEM FOR VEHICLE

TECHNICAL FIELD

The present invention relates in general to a steering system that is to be disposed in a vehicle, and more particularly to a steering system having a function enabling change of a ratio of a wheel turning amount of a wheel turning device to an operating amount of a steering operation member.

BACKGROUND ART

In these days, there is a study of, as a steering system that is to be provided in a vehicle, a steering system as disclosed in Patent Documents identified below, which has a so-called VGRS (Variable Gear Ratio Steering) function, i.e., a variable-gear-ratio transmission device enabling change of a ratio of a wheel turning amount of a wheel turning device to an operating amount of a steering operation member (hereinafter abbreviated to as "operation member" where appropriate) such as steering wheel. The system disclosed in Patent Document 1 has a construction in which a housing of the variable-gear-ratio transmission device is rotated together with rotation of a steering shaft. This construction requires drive-source connection cables to be arranged in such a manner that allows the rotation of the housing together with the rotation of the steering shaft. In each of the systems disclosed in Patent Documents 2 and 3, the housing of the transmission device is fixed to the wheel turning device so as not to be rotatable. This construction eliminates necessity of a particular arrangement of the drive-source connection cables, thereby permitting the system as a whole to have a simplified construction.

[Patent Document 1] JP-H10-287250A
[Patent Document 2] JP-2003-406349A
[Patent Document 3] JP-2005-162124A

DISCLOSURE OF THE INVENTION

(A) Outline of the Invention

The variable-gear-ratio transmission device with the VGRS function, as disclosed in the above-identified Patent Documents, includes a drive source and a differential mechanism that includes a movable element movable by the drive source. In general, such a transmission device has a construction in which movement of the movable element of the differential mechanism can be inhibited by a locking mechanism so that an operation applied to the operation member can be transmitted to the wheel turning device at a fixed value as a transmission ratio. This construction is designed in view of a risk that the operation applied to the operation member is not transmitted to the wheel turning device, for example, in event of failure of the drive source. However, each of the systems of Patent Documents 2 and 3 has a problem that a so-called deadlock could be caused by operation of the locking mechanism in a case in which the elements of the differential mechanism are stuck to each other, for example, by entrance of foreign object therebetween, thereby making it difficult to steer the wheel. This is one of problems encountered in the system having the variable-gear-ratio transmission device, described in detail, the system having the variable-gear-ratio transmission device the housing of which is fixed to a body of the vehicle. In the system equipped with such a transmission device, there is still room for improvement for increasing the utility, such as dealing with the above problem. The present invention was made in the light of the background art discussed above, and has an object of the invention to provide a steering system having a high serviceability in the practical use.

For achieving the above object, a vehicle steering system of the present invention is a steering system which has a movement-amount variably transmitting device whose housing is fixedly provided in a body of a vehicle, and which is characterized in that the variable-gear-ratio transmission device has an arrangement in which an amount of a relative movement of a first element connected to a steering operation member and a second element connected to a wheel turning device is changeable depending on an amount of movement of a third element engaged with the first and second elements, and in that the variable-gear-ratio transmission device has a third-element-movement inhibiting device capable of inhibiting the movement of the third element and a third-element-movement inhibition cancelling device configured to cancel inhibition of the movement of the third element, which is made by the third-element-movement inhibiting device.

According to the vehicle steering system of the present invention, even in a case in which elements of a differential mechanism are stuck to each other, for example, the third element can be allowed to be moved by the third-element-movement inhibition cancelling device that is operated to cancel inhibition of the movement of the third element, thereby enabling a vehicle operator to appropriately perform a steering operation.

(B) Modes of the Claimable Invention

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein. It is noted that mode (1) is a mode serves a base of a vehicle steering system as the claimable invention, and the claimable invention can be constituted by mode (1) to which technical features recited in suitably selected one or ones of the other modes are added.

Relationships between the below-described modes and claims are: mode (41) citing mode (1) corresponds to claim 1; claim 1 to which technical features of mode (42) are added corresponds to claim 2; claim 2 to which technical features of mode (5) are added corresponds to claim 3; claim 3 to which technical features of mode (6) are added corresponds to claim 4; claim 2 or 4 which technical features of modes (7), (9), (10) and (11) are added corresponds to claim 5; claim 5 to which technical features of mode (12) are added corresponds to claim 6; claim 5 or 6 to which technical features of mode (13) are added corresponds to claim 7; claim 1 to which technical features of mode (43) are added corresponds to claim 8; claim 8 to which technical features of mode (20) are added corresponds to claim 9; claim 8 or 9 to which technical features of mode (23) are added corresponds to claim 10; claim 8 or 10 to which technical features of mode (24) are added corresponds to claim 11; claim 11 to which technical features of mode (25) are added corresponds to claim 12; claim 11 or 12 to which technical features of mode (26) are added corresponds to claim 13; any one of claims 11 through 13 to which technical features of mode (27) are added corresponds to claim 14; any one of claims 11 through 14 to which technical features of modes (31) and (32) are added corresponds to claim 15; and claim 1 or 15 to which technical features of mode (2) are added corresponds to claim 16.

(1) A steering system for a vehicle, including:
a steering operation member operable by an operator of the vehicle;
a movement-amount variably transmitting device having: a housing fixedly provided in a body of the vehicle; a differential mechanism constructed to include (a) a first element movably disposed in the housing and connected to the steering operation member so as to be moved by an amount corresponding to an operating amount of the steering operation member, (b) a second element disposed in the housing and movable relative to the first element, and (c) a third element engaged with the first and second elements; and a drive source fixedly provided in the housing and configured to move the third element, such that an amount of a relative movement of the first and second elements is changeable depending on an amount of a movement of the third element; and
a wheel turning device connected to the second element so as to turn a wheel of the vehicle by a wheel turning amount corresponding to an amount of a movement of the second element,
wherein the movement-amount variably transmitting device has a third-element-movement inhibiting device capable of inhibiting the movement of the third element.

As described above, the present mode is a mode reciting components common to various forms of the claimable invention, and has a significance as a base mode for the claimable invention. The steering system of the present mode is, described plainly, a steering system having a VGRS actuator fixedly provided in the vehicle body, wherein the VGRS actuator is equipped with the above-described locking mechanism.

The "wheel turning device" recited in this mode has a construction that is not particularly limited. It is therefore possible to employ any one of various known constructions such as a construction including a steering rod interconnecting wheels and a mechanism configured to axially move the steering rod. As the mechanism for moving the steering rod, for example, a rack pinion mechanism or a ball screw mechanism can be employed.

The "movement-amount variably transmitting device" recited in the present mode is a so-called VGRS actuator that is capable of changing the amount of the relative movement of the first and second elements, i.e., a transmission ratio, based on a parameter such as a running speed of the vehicle. The "housing" constituting the movement-amount variably transmitting device may be fixed to a portion that is not particularly limited, as long as it is fixedly disposed in the vehicle body. As the housing, it is therefore possible to employ any one of various housings such as a housing fixed to a portion of the vehicle body, a housing fixed to a housing of the wheel turning device where the wheel turning device is arranged to move the steering rod in the axial direction in the system, and a housing fixed to a steering column where the system is equipped with the steering column that is constructed to include a tube and a shaft rotatably held in the tube. The "differential mechanism" constituting the movement-amount variably transmitting device has a construction that is not particularly limited, and may be a mechanism, for example, in which the first and second elements are rotatable relative to each other while the third element is engaged with the first and second elements and is rotatable. Specifically, it is possible to employ any one of various known mechanisms such as a mechanism constituted by bevel gears meshing with each other, a planetary gear mechanism, a harmonic gear mechanism (of either two-ring-gears type or cup type) and a cycloid speed reduction mechanism. Further, as the "drive source" that is fixedly provided in the housing, it is possible to employ, for example, an electric motor having a stator fixed to the housing.

The above-described movement-amount variably transmitting device has the "third-element-movement inhibiting device" (e.g., locking mechanism) that is capable of inhibiting the movement of the third element. In the present mode, the third-element-movement inhibiting device can be configured to inhibit the movement of the third element in event of failure of the movement-amount variably transmitting device such as a case of failure of the drive source per se and a case of activation of a protection circuit in response to an excessively large load applied to the drive source. In a case of failure allowing a generally free movement of the third element, an operation applied to the operation member is not transmitted to the wheel turning device. In such a case of the failure, the transmission of the movement from the first element to the second element via the third element can be made with a certain constant transmission ratio, namely, with a predetermined amount of the relative movement of the first and second elements, by inhibiting the movement of the third element by the third-element-movement inhibiting device. Thus, the operation of the operation member can be transmitted to the wheel turning device. That is, the present mode is a mode effective in the system in which the general free movement of the third element is allowed by some factor. It is noted that the third-element-movement inhibiting device has a construction that is not particularly limited and that it is possible to employ any one of various known constructions that make it possible to substantially limit the movement of the third element.

Further, there is also a case of occurrence of failure that disables the third element from being moved by application of a drive force to the third element. Specifically described, for example, in event of failure caused by entrance of foreign object into between the third element and the first or second element, the differential mechanism is placed in a state in which elements of the differential mechanism are stuck to each other, in other words, in a state (hereinafter referred to as "relative-movement disabled state" where appropriate) in which as if the first and second elements were fixed to each other. In such an event, the inhibition of the movement of the third element engaged with the first and second elements would cause a so-called deadlock making it difficult to steer the wheel. Where the housing of the movement-amount variably transmitting device is not fixed to the vehicle body, the wheel can be steered by the operation member even in event of occurrence of the deadlock in the differential mechanism. Therefore, the deadlock is problematic, particularly, in the steering system having the movement-amount variably transmitting device the housing of which is fixed to the vehicle body.

In each of some of the below-described modes, there is a construction that cancels the inhibition of the movement of the third element which is made by the third-element-movement inhibiting device, for the purpose of coping with the above-described relative-movement disabled state. This construction is not particularly limited, and can be any one of various constructions, for example, such as (A) a construction in which the movement of the third element is allowed while the movement of the third element is inhibited by the third-element-movement inhibiting device and (B) a construction in which the third-element-movement inhibiting device is controlled such that the inhibition of the movement of the third element is not performed by the third-element-movement inhibiting device or such that the inhibition of the movement of the third element is released. Owing to such a construction allowing the movement of the third element, even in the relative-movement disabled state, the transmission of the movement from the first element to the second element can be made without the relative movement of the first and second elements. In other words, the wheel can be steered by the operation member with a state of the transmission ratio of 1:1, i.e., with a state in which the movement is transmitted from the first element to the second element at a constant movement ratio of substantially 1:1.

(2) The steering system according to mode (1), wherein the first element and the second element are constructed to include respective circular splines having respective numbers of teeth that are different from each other, and are rotatable, wherein the third element is constructed to include a flexspline which meshes with the circular splines and a wave generator on which the flexspline is fitted, and wherein the drive source is a motor configured to rotate the wave generator, so that the movement-amount variably transmitting device is constructed to include a harmonic gear mechanism.

The present mode is a mode in which the differential mechanism of the movement-amount variably transmitting device is limited to the harmonic gear mechanism (that is called also a harmonic drive mechanism (registered trademark) or a strain wave gearing mechanism). Described in detail, it is a mode in which the differential mechanism is limited to the harmonic gear mechanism having two ring gears. This harmonic gear mechanism is a speed changing mechanism capable of providing a large speed reduction ratio, so that the steering system can be made compact owing to reduction of the drive source in size, according to the preset mode.

(3) The steering system according to mode (1) or (2), wherein the third-element-movement inhibiting device has an engaged portion which is provided on the third element and an engaging portion which is provided in the housing and which is engageable with the engaged portion, such that the movement of the third element is inhibited by engagement of the engaging portion with the engaged portion.

The present mode is a mode in which a limitation is added to construction of the third-element-movement inhibiting device. The third-element-movement inhibiting device recited in the present mode has a construction in which the movement of the third element is inhibited by an interaction of the engaging portion and the engaged portion, namely, a construction including a stopper mechanism.

(4) The steering system according to any one of modes (1)-(3), wherein the movement-amount variably transmitting device has a third-element-movement allowing mechanism configured to allow the movement of the third element when an amount of a movement force forcing the third element to be moved becomes larger than a predetermined threshold during inhibition of the movement of the third element, which inhibition is made by the third-element-movement inhibiting device.

When the movement of the third element is inhibited in the above-described relative-movement disabled state in which the first and second elements are disabled from being moved relative to each other, there is a case in which a large force is applied from the first or second element to the third element to force the third element to be moved. That is, the term "when an amount of a movement force forcing the third element to be moved becomes larger than a predetermined threshold during inhibition of the movement of the third element", which is recited in the present mode, is a case of occurrence of a phenomenon that could occur in the relative-movement disabled state, for example. In this sense, it can be considered that the present mode is a mode for coping with the relative-movement disabled state. Further, the present mode is a mode allowing the movement of the third element while leaving the third-element-movement inhibiting device to be activated for inhibiting the movement of the third element. According to the present mode, even in the relative-movement disabled state, the transmission of the movement can be made without the relative movement of the first and second elements, by allowing the movement of the third element, thereby enabling a vehicle operator to appropriately perform a steering operation.

The "movement force" recited in the present mode means a force forcing the third element to be moved, and corresponds to a force which acts on the third element via the first element and which is based on the operating force applied to the operation member, and a force which acts on the third element via the second element and which is based on a force inversely applied from the wheel turning device, for example. The "third-element-movement allowing mechanism" recited in the present mode may be, for example, (A) a mechanism which allows the movement of the third element when the movement force overcomes a force that is generated by the third-element-movement inhibiting device to inhibit the movement of the third element, or (B) a mechanism which is constituted principally by a device such as an electromagnetic clutch such that the movement of the third element is allowed by controlling the device. Where the third-element-movement allowing mechanism is a mechanism operable by a control, the mechanism requires a control device, a drive circuit and the like. Therefore, from a point of view of establishment of simplicity of the movement-amount variably transmitting device, it is preferable that the third-element-movement allowing mechanism is a mechanism which allows the movement of third element by effect of the movement force.

(5) The steering system according to mode (4), wherein the third-element-movement inhibiting device has an engaged portion which is provided on the third element and an engaging portion which is provided in the housing and which is engageable with the engaged portion, such that the movement of the third element is inhibited by engagement of the engaging portion with the engaged portion, and wherein the third element is held in frictional engagement with the engaged portion, and the third-element-movement allowing mechanism is constituted by a construction in which the movement of the third element is allowed in a case in which the movement force overcomes a frictional force acting between the third element and the engaged portion.

The present mode is a mode which has a limitation that the third-element-movement inhibiting device has a particular stopper mechanism while the third-element-movement allowing mechanism is a mechanism allowing the movement of the third element by effect of the above-described movement force. Described in detail, the frictional force acting between the third element and the engaged portion is set to have a predetermined amount, so that the movement of the third element relative to the engaged portion is allowed with the engaged portion being held in engagement with the engaging portion, when the amount of the movement force is larger than the predetermined amount of the frictional force. That is, in the present mode, the third-element-movement allowing mechanism is not a mechanism requiring some device to be controlled, so that the movement-amount variably transmitting device can have a relatively simple construction.

(6) The steering system according to mode (5), wherein the third element is rotatable, wherein the engaged portion is provided in a rotatable member that is rotatable relative to the third element, and wherein the third-element-movement allowing mechanism is constructed to include a tolerance ring that is interposed between the rotatable member and the third element.

The present mode is a mode in which the construction of the third-element-movement allowing mechanism is further limited. In the present mode, the third-element-movement allowing mechanism is constructed by simply adding the tolerance ring to the movement-amount variably transmitting device equipped with the third-element-movement inhibiting device that has the stopper mechanism, so that the movement-amount variably transmitting device can be made compact with a simple construction.

(7) The steering system according to any one of modes (1)-(6), including an assisting mechanism configured to assist a wheel turning force for turning the wheel, by an assisting force generated by the assisting mechanism.

(8) The steering system according to mode (7), wherein the assisting mechanism is provided in the wheel turning device.

(9) The steering system according to mode (7) or (8), including a control device configured to control the steering system, wherein the control device is configured to execute an assisting control for controlling the assisting force generated by the assisting mechanism, based on an operating force of the steering operation member.

Each of the above-described modes is a mode relating to a system having a function of assisting a wheel turning force applied to the wheel by, in addition to the operating force applied to the operation member, a force generated by other drive source, namely, a mode relating to a so-called power steering system. It is noted that it is possible to employ, as the "control device", an electronic control unit which is constituted principally by a computer and which includes a drive circuit for the drive source as needed.

(10) The steering system according to mode (9), wherein the control device is configured to execute an assisting-force increasing control for increasing the assisting force in a state in which the movement of the third element is inhibited by the third-element-movement inhibiting device.

When the movement of the third element is inhibited by the third-element-movement inhibiting device, the transmission ratio of the movement-amount variably transmitting device is fixed so that the operation of the operation member is transmitted to the wheel turning device at a constant transmission ratio. Therefore, there could be a situation in which the operation member has to be operated by an increased amount, and a burden imposed on the operation is possibility increased in such a situation. According to the present mode, when the movement of the third element is inhibited by the third-element-movement inhibiting device, the wheel turning force is assisted by a larger degree thereby reducing the burden imposed on the steering operation performed by the vehicle operator.

(11) The steering system according to mode (10), wherein the movement-amount variably transmitting device has a third-element-movement allowing mechanism configured to allow the movement of the third element in a case in which an amount of a movement force forcing the third element to be moved becomes larger than a predetermined threshold in a state in which the movement of the third element is inhibited by the third-element-movement inhibiting device, and wherein the control device is configured to execute the assisting-force increasing control in a relative-movement disabled state in which the first element and the second element are disabled from being moved relative to each other.

As described above, the inhibition of the movement of the third element in the relative-movement disabled state would cause a so-called deadlock in the differential mechanism of the movement-amount variably transmitting device, thereby making it difficult to perform the steering operation. The third-element-movement allowing mechanism is provided with this being taken into account, and enables the movement to be transmitted with the first and second elements being fixed to each other, thereby enabling the wheel to be turned by the operation member. However, since the third-element-movement allowing mechanism works when the movement force acting on the third element becomes larger than a predetermined threshold, the operating force applied to the operation member has to be made large by a certain degree in order to turn the wheel in the relative-movement disabled state. This increases the burden imposed on the vehicle operator who performs the steering operation. According to the present mode, when the wheel is turned by using the third-element-movement allowing mechanism in the relative-movement disabled state, the wheel turning force is effectively assisted whereby the burden imposed on the vehicle operator is effectively reduced.

(12) The steering system according to mode (11), including a relative-movement amount detector configured to detect the amount of the relative movement of the first and second elements, wherein the control device is configured to execute the assisting-force increasing control, based on the amount of the relative movement detected by the relative-movement amount detector.

It is possible to consider that the first and second elements are disabled from being substantially moved relative to each other, for example, when the amount of the relative movement of the first and second elements is substantially 0 (zero), in other words, when the amount of the movement of the first element and the amount of the movement of the second element are substantially equal to each other. According to the present mode, the relative-movement disabled state can be easily detected by detecting the amount of the relative movement of the first and second elements. Further, according to the present mode, the assisting force can be increased by the assisting mechanism based on the detection. The relative-movement amount detector recited in the present mode is capable of reliably detecting the relative-movement disabled state, so that it is possible to further effectively assist the wheel turning force.

As described above, the amount of the relative movement of the first and second elements is controllable to be changed depending on a parameter such as the running speed of the vehicle. Therefore, during such a control executed on the movement-amount variably transmitting device, a state in which the amount of the relative movement of the first and second elements is substantially 0 (zero) could be established at a certain point of time. However, in the relative-movement disabled state, the amount of the relative movement of the first and second elements is held at substantially 0 (zero) irrespective of a value of the above-described parameter, so that it is possible to recognize the relative-movement disabled state based on this fact. Specifically described, for example, during execution of the control in which the transmission ratio of the movement-amount variably transmitting device can be changed depending on the vehicle running speed, it is possible to recognize the relative-movement disabled state, when the amount of the relative movement of the first and second elements is held at substantially 0 (zero) in spite of change of the vehicle running speed.

As the "relative-movement amount detector" recited in the present mode, for example, it is possible to employ a detector configured to detect the relative movement amount based on the movement amount of the first element and the movement amount of the second element. The movement amount of the first element and the movement amount of the second element may be detected either directly or indirectly. For example, the movement amount of the first element may be detected from an operating amount of the operation member such as an angular position of a steering wheel, while the movement amount of the second element may be detected from a wheel tuning amount such as an amount of displacement of the steering rod.

(13) The steering system according to mode (11) or (12), wherein the third-element-movement inhibiting device has an engaged portion which is provided on the third element and an engaging portion which is provided in the housing and which is engageable with the engaged portion, such that the movement of the third element is inhibited by engagement of the engaging portion with the engaged portion, wherein the third-element-movement allowing mechanism is constituted by a construction in which the movement of the third element is allowed when the movement force overcomes a frictional force acting between the third element and the engaged portion that are held in frictional engagement with each other, and wherein the assisting-force increasing control is a control executed to increase the assisting force in the assisting control, based on the frictional force.

The present mode is a mode of a case in which the third-element-movement allowing mechanism has a construction utilizing effect of the above-described frictional force. Where the third-element-movement allowing mechanism recited in the present mode is employed, the operation force has to be increased by an amount corresponding to the frictional force, so as to make it possible to turn the wheel in the relative-movement disabled state. With this being taken into account, in the present mode, the force assisting the wheel turning force is determined based on the above-described frictional force, so that it is possible to appropriately assist the wheel turning force. It is noted that, in the present mode, the assisting force may be increased by an amount corresponding to the friction force, i.e., by an amount precisely offsetting the frictional force, or also may be increased by an amount corresponding to a part of the frictional force, i.e., by an amount offsetting some percentage of the frictional force.

(14) The steering system according to any one of modes (11)-(13), wherein the control device is configured to control also operation of the drive source of the movement-amount variably transmitting device, and is configured, upon execution of the assisting-force increasing control, to establish a state in which the drive source does not provide a resistance against the movement of the third element.

For example, when the wheel is turned in the relative-movement disabled state by utilizing the above-described third-element-movement allowing mechanism, the drive source connected to the third element could provide a resistance against the turning of the wheel. Described specifically, where the drive source is an electric motor, the motor generates a relatively large braking force based on an electromotive force when input terminals of the motor are short-circuited, and does not generate the braking force based on the electromotive force so as not to provide the resistance against the turning of the wheel when the input terminals of the motor are opened from each other. The present mode is a mode in which the drive source is caused not to provide the resistance against the turning of the wheel. According to the present mode, it is possible to minimize the burden imposed on the steering operation.

(15) The steering system according to any one of modes (9)-(14), including an operating force detector having a deformable member that is elastically deformed depending on the operating force of the steering operation member, and a deformation amount sensor that is configured to detect an amount of deformation of the deformable member, so as to detect the operating force of the steering operation member based on the deformation amount detected by the deformation amount sensor, wherein the control device is configured to execute the assisting control, based on the operating force of the steering operation member that is detected by the operating force detector.

According to the present mode, the operating force of the operation member can be suitably detected, whereby the wheel turning force can be effectively assisted. In the present mode, specifically, a torsion bar can be employed as the "deformable member", and a relative-rotation amount sensor configured to detect an amount of relative displacement (relative rotation) of opposite end portions of the torsion bar can be employed as the "deformation amount sensor". Thus, the "operating force detector" can be configured to detect the operating force of the operation member based on an amount of twisting of the torsion bar that is obtained by the deformation amount sensor.

(16) The steering system according to mode (15), wherein the operating force detector is provided in the movement-amount variably transmitting device.

As in the present mode, where the operating force detector is built in the movement-amount variably transmitting device, the steering system can be made compact.

(17) The steering system according to mode (15) or (16), wherein one and the other of opposite end portions of the deformable member are connected to the steering operation member and the first element, respectively, and wherein the deformation amount sensor is configured to detect an amount of relative displacement of the one and the other of opposite end portions of the deformable member.

(18) The steering system according to mode (15) or (16), wherein one and the other of opposite end portions of the deformable member are connected to the wheel turning device and the second element, respectively, and wherein the deformation amount sensor is configured to detect an amount of relative displacement of the one and the other of opposite end portions of the deformable member.

Each of the above-described two modes recites an additional limitation as to a portion in which the deformable member constituting the operating force detector is provided. Particularly, the latter mode is effective to a case in which the wheel is turned in the relative-movement disabled state by utilizing the third-element-movement allowing mechanism. Since the third-element-movement allowing mechanism works when the movement force acting on the third element becomes a predetermined threshold, as described above, it is not possible to effectively detect an increase amount of the operating force that is required for application of the movement force of the predetermined amount, where the deformable member is disposed between the second element and the wheel turning device. Described in detail, where the deformable member is disposed on a downstream side of a portion that resists the steering operation, it is not possible to expect an increase of the amount of deformation of the deformable member that corresponds to an increase of the operating force. Therefore, in the latter one of the above-described two modes, the execution of the assisting-force increasing control provides a great merit, since the wheel turning force can be suitably assisted by the assisting-force increasing control even if the increase of the operating force is not suitably detected by the operating force detector.

On the other hand, in the former one of the above-described two modes, the execution of the assisting-force increasing control provides some degree of merit that is not sufficiently great as the merit in the latter mode, since the increase of the operating force can be detected by the operating force detector in the case in which the wheel is turned in the relative-movement disabled state by utilizing the third-element-movement allowing mechanism. However, this can be taken positively in the former mode. That is, the former mode is a mode advantageous from a point of view of simplicity and convenience of the assisting control, since the wheel turning force can be relatively satisfactorily assisted even without execution of the assisting-force increasing control.

(19) The steering system according to any one of modes (1)-(18), including a control device configured to control the steering system, wherein the control device is configured to execute a third-element-movement inhibiting control for inhibiting the movement of the third element by controlling operation of the third-element-movement inhibiting device.

Where the third-element-movement inhibiting device is controlled by the control device as in the present mode, the inhibition of the movement of the third element can be suitably performed, and the inhibition of the movement can be easily released as described later.

(20) The steering system according to mode (19), wherein the control device is configured to execute the third-element-movement inhibiting control in event of failure of the movement-amount variably transmitting device that disenables the drive force from moving the third element.

The term "failure that disenables the drive force from moving the third element" recited in the present mode broadly encompasses various cases such as a case of failure of the drive source per se, a case of disconnection of wire connecting an electrically operated drive source as the drive source and an electric power source and a case of activation of a protection circuit in response to an excessively large load applied to the drive source. As described above, in a case of failure allowing generally free movement of the third element, the operation applied to the operation member is not transmitted to the wheel turning device, but the turning of the wheel can be made with a certain transmission ratio, by inhibiting the movement of the third element by the third-element-movement inhibiting device. It is noted that the above-described failure includes also the above-described relative-movement disabled state, i.e., a state in which the first and second elements are disabled from being moved relative to each other, for example, due to sticking of elements of the differential mechanism.

(21) The steering system according to mode (19) or (20), wherein the control device is configured, in a relative-movement disabled state in which the first element and the second element are disabled from being moved relative to each other, to execute a third-element-movement non-inhibiting-state establishing control for controlling the third-element-movement inhibiting device so as to establish a state in which the movement of the third element is not inhibited.

According to the present mode, the movement of the third element is not inhibited by the third-element-movement inhibiting device even in event of the above-described relative-movement disabled state. Thus, the movement transmission can be made without the relative movement of the first and second elements, whereby the turning of the wheel by operation of the operation member is assured. That is, according to the present mode, it is possible for the vehicle operator to appropriately perform the steering operation. It is noted that the "third-element-movement non-inhibiting-state establishing control" recited in the present mode may be either a control executed for releasing a state in which the movement of the third element is inhibited by the third-element-movement inhibiting device or a control executed for preventing the movement of the third element from being inhibited before the inhibition, as described later. In the latter control, i.e., a control in which the inhibition of the movement of the third element is not made by the third-element-movement inhibiting device, a deadlock is not caused in any moment in event of failure caused by the relative-movement disabled state, thereby making it possible to reduce discomfort given to the vehicle operator during the steering operation.

(22) The steering system according to mode (21), wherein the control device is configured to control also operation of the drive source of the movement-amount variably transmitting device, and is configured, upon execution of the third-element-movement non-inhibiting-state establishing control, to establish a state in which the drive source does not provide a resistance against the movement of the third element.

As described above, when the wheel is turned in the relative-movement disabled state by utilizing the above-described third-element-movement allowing mechanism, the drive source connected to the third element could provide a resistance against the turning of the wheel. According to the present mode with this being taken into account, it is possible to minimize the burden imposed on the steering operation. Since description about the present mode overlaps the description of the previous mode, the description is omitted herein.

(23) The steering system according to mode (21) or (22), including a relative-movement amount detector configured to detect the amount of the relative movement of the first element and the second element, wherein the control device is configured to execute the third-element-movement non-inhibiting-state establishing control, based on the amount of the relative movement detected by the relative-movement amount detector.

The present mode may be, for example, a mode in which the above-described relative-movement disabled state is detected based on the amount of the relative movement of the first and second elements and then third-element-movement non-inhibiting-state establishing control is executed based on an outcome of the detection. It is therefore possible to reliably establish a state in which the movement of the third element is not inhibited in the relative-movement disabled state. Since description of the present mode overlaps the previous description about the relative-movement amount detector, the description is omitted herein.

(24) The steering system according to any one of modes (21)-(23), wherein the control device is configured, when the movement of the third element is inhibited by the third-element-movement inhibiting device in the relative-movement disabled state in which the first element and the second element are disabled from being moved relative to each other, to execute the third-element-movement non-inhibiting-state establishing control, by executing a third-element-movement inhibition releasing control for releasing the inhibition of the movement of the third element by controlling operation of the third-element-movement inhibiting device.

The present mode is, briefly described, for example, a mode in which the inhibition of the movement of the third element is released based on the relative-movement disabled state during execution of the third-element-movement inhibiting control. In other words, the preset mode is a mode in which it is possible to establish a selected one of a state inhibiting the movement of the third element and a state allowing the movement of the third element in event of failure of the movement-amount variably transmitting device. For example, one of the two states can be selected depending on content of the failure.

(25) The steering system according to mode (24), wherein the control device is configured to execute the third-element-movement inhibition releasing control in a case in which an amount of a movement force forcing the third element to be moved becomes larger than a predetermined threshold in a state in which the movement of the third element is inhibited by the third-element-movement inhibiting device.

The present mode recites an additional limitation regarding recognition of the relative-movement disabled state upon execution of the third-element-movement inhibition releasing control. As described above, the inhibition of the movement of the third element in the relative-movement disabled state would cause a deadlock in the differential mechanism. Then, if the operation member is operated in such a state, for example, there could be occurred a phenomenon that the amount of the movement force acting on the third element becomes larger than a predetermined threshold. The present mode is a mode in which, upon occurrence of such a phenomenon, the control device releases the inhibition of the movement of the third element by the third-element-movement inhibiting device and allows the movement of the third element. In the present mode, as in the above-described mode in which the movement-amount variably transmitting device has the third-element-movement allowing mechanism, the third element can be moved when the amount of the movement force acting on the third element becomes larger than the predetermined threshold.

(26) The steering system according to mode (24) or (25), wherein the third-element-movement inhibiting device has an engaged portion which is provided on the third element and an engaging portion which is provided in the housing and which is engageable with the engaged portion, such that the movement of the third element is inhibited in an engaged state in which the engaged portion is engaged with the engaging portion, wherein the movement-amount variably transmitting device includes an acting force detector that is configured to detect an acting force acting between the engaging portion and the engaged portion in the engaged state, and wherein the control device is configured to execute the third-element-movement inhibition releasing control, in a case in which an amount of the acting force detected by the acting force detector becomes larger than a predetermined threshold.

The present mode is a mode which has a limitation that the third-element-movement inhibiting device has a particular stopper mechanism and in which the third-element-movement inhibition releasing control is executed based on an acting force acting between the engaging portion and the engaged portion that are included in the stopper mechanism. It is expected that the stopper mechanism receives a relatively large force as the acting force, for example, when the operation member is operated in event of a deadlock occurring in the differential mechanism. The present mode is a mode in which the relative-movement disabled state is detected based on the acting force and then third-element-movement inhibition releasing control is executed based on an outcome of the detection.

The "acting force" recited in the present mode can be considered as a kind of the above-described movement force, and corresponds to acting and reacting forces acting between the engaging and engaged portions when the engaging and engaged portions are held in engagement with each other. Therefore, the present mode can be considered as one mode of the mode in which the third-element-movement inhibition releasing control is executed when the movement force acting on the third element becomes larger than a predetermined threshold. It is noted that the "acting force detector" has a construction that is not particularly limited, and may be like a load sensor that is provided between the engaging and engaged portions or provided in one of the engaging and engaged portions so as to detect the acting force acting between the engaging and engaged portions. Specifically described, the acting force detector can be constructed to have a distortion gage that is disposed in one of the engaging and engaged portions so as to obtain an amount of distortion of the one of the engaging and engaged portions so that the acting force is detected based on the distortion amount detected by the distortion gage.

(27) The steering system according to any one of modes (24)-(26), wherein the control device is configured to execute the third-element-movement inhibition releasing control, in a case in which an amount of an operating force of the steering operation member becomes larger than a predetermined threshold.

When the operation member is operated in event of a deadlock occurring in the differential mechanism, there is a high possibility that the operating force applied to the operation member becomes large. That is, the present mode is a mode in which, in a case in which the amount of the operating force of the operation member becomes larger than a predetermined threshold, it is regarded that the differential mechanism is placed in the relative-movement disabled state, so that the transmission of the movement from the first element to the second element is enabled by releasing the inhibition of the movement of the third element. It is noted that the steering operation member is connected to the first element so that the operating force of the operation member relates to the movement force that acts on the third element via the first element. Therefore, the operating force of the operation member can be considered as a kind of the movement force, and the present mode can be considered as one mode of the mode in which the third-element-movement inhibition releasing control is executed when the movement force acting on the third element becomes larger than a predetermined threshold.

(28) The steering system according to mode (27), including an operating force detector having a deformable member that is elastically deformed depending on the operating force of the steering operation member, and a deformation amount sensor that is configured to detect an amount of deformation of the deformable member, so as to detect the operating force of the steering operation member based on the deformation amount detected by the deformation amount sensor, wherein the control device is configured to execute the third-element-movement inhibition releasing control, based on the operating force of the steering operation member that is detected by the operating force detector.

(29) The steering system according to mode (28), wherein the operating force detector is provided in the movement-amount variably transmitting device.

(30) The steering system according to mode (28) or (29), wherein one and the other of opposite end portions of the deformable member are connected to the steering operation member and the first element, respectively, and wherein the deformation amount sensor is configured to detect an amount of a relative displacement of the one and the other of opposite end portions of the deformable member.

Each of the above-described three modes is a mode relating to the operating force detector for detecting the operating force of the operating member. The operating force detector may be substantially the same as the operating force detector that is described in the mode relating to the assisting control. Therefore, description about each of the above-described three modes overlaps the previous description, the description is omitted herein.

(31) The steering system according to any one of modes (24)-(30), including a relative-movement amount detector configured to detect the amount of the relative movement of the first element and the second element, wherein the control device is configured to execute the third-element-movement inhibition releasing control, based on the amount of the relative movement detected by the relative-movement amount detector.

The present mode is a mode in which the outcome of the detection made by the relative-movement amount detector is utilized upon execution of the third-element-movement inhibition releasing control. Since description about each of the present mode overlaps the description of the previous mode, the description is omitted herein.

(32) The steering system according to mode (31), wherein the third-element-movement inhibiting device is configured to allow the movement of the third element by an amount within a predetermined threshold range and to inhibit the movement of the third element by an amount exceeding the predetermined threshold range, and wherein the control device is configured to execute the third-element-movement inhibition releasing control, when the first and second elements are disabled from being moved relative to each other in a state in which the third element is allowed to be moved by the amount within the predetermined threshold range.

The present mode is a mode for enabling the detection of the above-described amount of the relative movement in a case in which the movement of the third element is inhibited by the third-element-movement inhibiting device. In the present mode, the third-element-movement inhibiting device is configured not to completely inhibit the movement of the third element, but to allow the third element to be moved by an amount within a predetermined threshold range while inhibiting the third element from being moved by the amount exceeding the predetermined threshold range. It is noted that the "within the predetermined threshold range" recited in the present mode may be, for example, a small range allowing a backlash or play. According to the present mode, it can be determined whether the differential mechanism is placed in the relative-movement disabled state or not, based on the amount of the relative movement, even in a state in which the third-element-movement inhibiting device works.

(33) The steering system according to mode (32), wherein the third-element-movement inhibiting device has an engaged portion which is provided on the third element and an engaging portion which is provided in the housing and which is engageable with the engaged portion, such that the movement of the third element is inhibited by engagement of the engaging portion with the engaged portion, and such that the movement of the third element by an amount corresponding to a play provided between the engaging portion and the engaged portion is allowed as the movement of third element by the amount within the predetermined threshold range.

The present mode is a mode which recites a limitation that the third-element-movement inhibiting device has a particular stopper mechanism and a limitation that the above-described predetermined threshold range corresponds to an amount of a backlash or play in a state of the engagement of the engaging portion and the engaged portion. According to the present mode, the movement of the third element by a relatively small amount makes it possible to determine whether the first and second elements are moved relative to each other or not.

(41) The steering system according to any one of modes (1)-(3), further including a third-element-movement inhibition cancelling device configured to cancel inhibition of the movement of the third element, which is made by the third-element-movement inhibiting device.

The present mode is a mode that generalizes some of the above-described modes. The term "third-element-movement inhibition cancelling device" can be considered as a generic term of means for coping with the relative-movement disabled state, and the present mode can be considered as a mode generic to the above-described modes each having the purpose of coping with the relative-movement disabled state. That is, the third-element-movement inhibition cancelling device is constituted principally by a mechanism allowing the movement of the third element, as described above. The third-element-movement inhibition cancelling device may be configured to allow the movement of the third element in a state in which the movement of the third element is being inhibited by the third-element-movement inhibiting device, or to control the third-element-movement inhibiting device so as not to cause the third-element-movement inhibiting device to inhibit the movement of the third element.

(42) The steering system according to mode (41), wherein the movement-amount variably transmitting device has a third-element-movement allowing mechanism configured to allow the movement of the third element in a case in which an amount of a movement force forcing the third element to be moved becomes larger than a predetermined threshold in a state in which the movement of the third element is inhibited by the third-element-movement inhibiting device, and wherein the third-element-movement inhibition cancelling device is constituted by the third-element-movement allowing mechanism.

Since the present mode has the above-described third-element-movement allowing mechanism, the present mode provides substantially the same effects as described regarding the modes each having the third-element-movement allowing mechanism. Further, in the present mode, it is also possible to employ technical features included in modes relating to the modes each having the third-element-movement allowing mechanism.

(43) The steering system according to mode (41) or (42), including a control device configured to control the steering system, wherein the control device is configured to control operation of the third-element-movement inhibiting device so as to execute a third-element-movement inhibiting control for inhibiting the movement of the third element, wherein the third-element-movement inhibition cancelling device is constituted by the control device that is configured, in a relative-movement disabled state in which the first element and the second element are disabled from being moved relative to each other, to execute a third-element-movement non-inhibiting-state establishing control for controlling operation of the third-element-movement inhibiting device so as to establish a state in which the movement of the third element is not inhibited.

The present mode is a mode for controlling the third-element-movement inhibiting device to establish a state in which the movement of the third element is not inhibited in the relative-movement disabled state. According to the present mode, the present mode provides substantially the same effects as described regarding the modes each reciting the third-element-movement non-inhibiting-state establishing control. Further, in the present mode, it is also possible to employ technical features included in modes relating to the modes each reciting the third-element-movement non-inhibiting-state establishing control.

BEST MODE FOR CARRYING OUT THE INVENTION

There will be described embodiments of the present invention, by reference to the accompanying drawings. It is to be understood that the claimable invention is not limited to the following embodiments, and may be otherwise embodied with various changes and modifications, such as those described in the foregoing "MODES OF THE INVENTION", which may occur to those skilled in the art.

First Embodiment (A) Construction of Steering System

Figure 1:
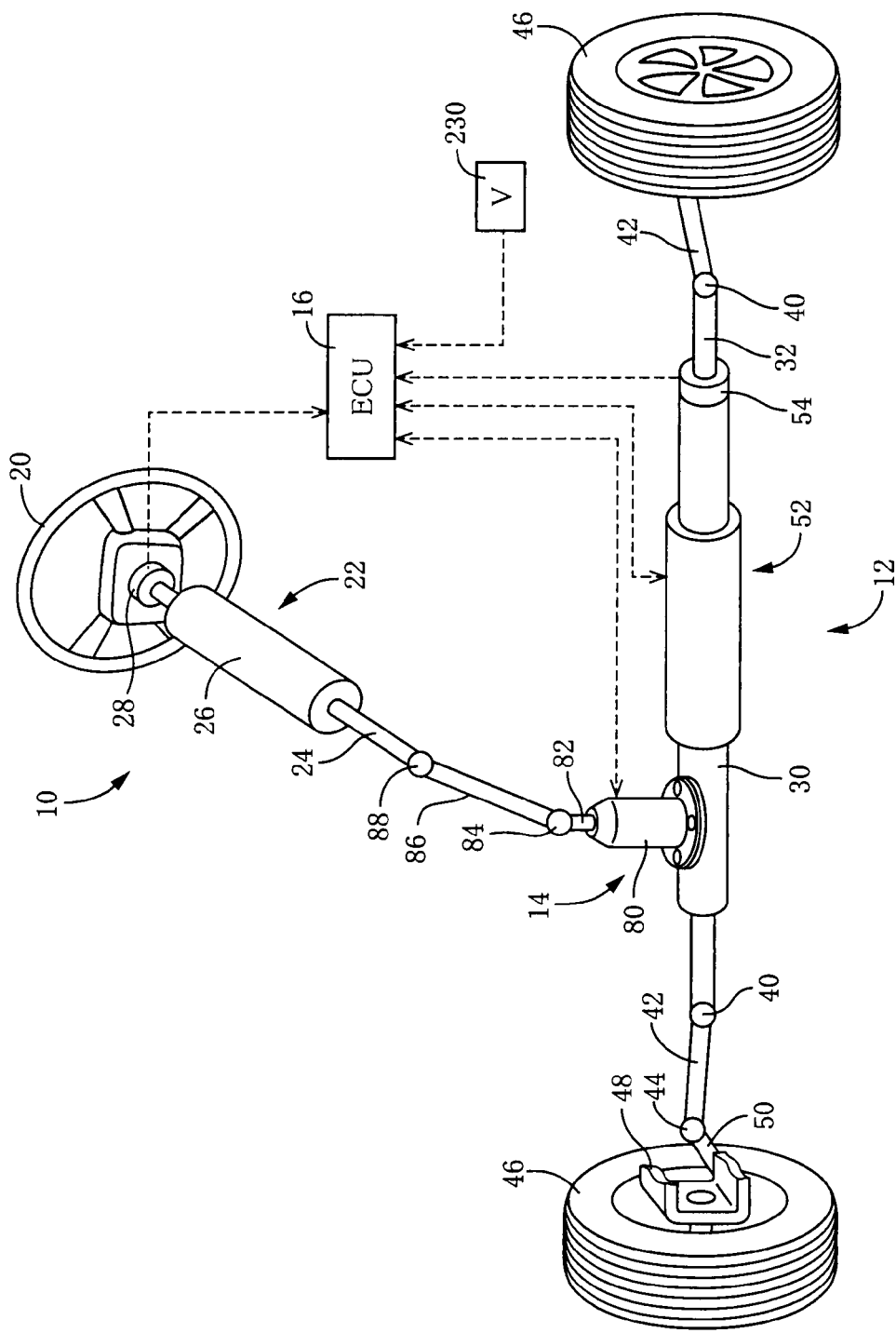
FIG. 1 is a schematic view showing an overall construction of a vehicle steering system of a first embodiment of the invention.

FIG. 1 is a schematic view showing an overall construction of a steering system of a first embodiment of the invention. The present steering system is a so-called electrical power steering system, and substantially sectioned into an operating device 10, a wheel turning device 12, a VGRS actuator 14 as a movement-amount variably transmitting device and an electronic control unit 16 (hereinafter abbreviated to as "ECU 16" where appropriate) as a control device. That is, the steering system is constructed to include these components.

The operating device 10 is constructed to include a steering wheel 20 as a steering operation member and a steering column 22 (hereinafter abbreviated to as "column 22" where appropriate). The column 22 is constructed to include a steering shaft 24 having an end portion to which the steering wheel 20 is attached, and a steering tube 26 (hereinafter abbreviated to as "tube 26" where appropriate) as a shaft housing in which the steering shaft 24 20 is rotatably held. The tube 26 is fixed to a reinforcement of an instrument panel whereby the column 22 is fixedly disposed in a body of a vehicle. Further, in the column 22, an operation angle sensor 28 is provided in the portion of the shaft 24 to which the steering wheel 20 is attached. The operation angle sensor 28 is provided to detect an operating angle of the steering wheel 20 as an operating amount of the operation member.

The wheel turning device 12 is constituted principally by a housing 30 that is fixed to the vehicle body (chassis, described in detail) and a steering rod 32 that is provided in the housing 30 so as to be movably in an axial direction (i.e., in a lateral direction of the vehicle). The wheel turning device 12 has a pinion shaft 34 as an input shaft to which a steering force is applied from the operating device 10. The steering rod 32 has a rack 38 formed therein and meshing with a pinion 36 that is formed in the pinion shaft 34, so that the pinion shaft 34 and the steering rod 32 is connected to each other through a rack pinion mechanism (see FIG. 2). Owing to such a construction, the wheel turning device 12 is configured to move the steering rod 32 in the above-described axial direction by rotation of the pinion shaft 34. The steering rod 32 has opposite end portions that are connected to end portions of respective right and left tie rods 42 through respective ball joints 40. The other end portions of the respective right and left tie rods 42 are connected through respective ball joints 44 to respective knuckle arm portions 50 that are included in respective steering knuckles 48 holding respective right and left steerable wheels 46. Further, the wheel turning device 12 is equipped with an assisting mechanism 52 that is configured to assist a wheel turning force required for turning the wheels 46, so that the axial movement of the steering rod 32 is assisted by the assisting mechanism 52. Although not being shown in the drawings, a thread groove (external thread) is formed in the steering rod 32, and a nut and an electric motor are provided in the housing 30 of the wheel turning device 12. The nut carries bearing balls, and is held in thread engagement with the thread groove of the steering rod 32. The electric motor is configured to rotate the nut. That is, the assisting mechanism 52 has a ball screw mechanism constituted by the thread groove and the nut, such that the axial movement of the steering rod 32 is assisted by a drive force of the electric motor. It is noted that the wheel turning device 12 is provided with a wheel-turning amount sensor 54 that is configured to detect an amount of movement of the steering rod 32.

The VGRS actuator 14 is a device having a function of transmitting rotation of the steering shaft 24 (which is caused in response to rotation of the steering wheel 20) to the wheel turning device 12. As shown in FIG. 1, the VGRS actuator 14 is fixed to the wheel turning device 12 through a housing 80 of the actuator 14 that is fastened to the housing 30 of the wheel turning device 12. An input shaft 82 of the VGRS actuator 14 includes an end portion which extends out from the housing 80 and which is connected an end portion of an intermediate shaft 86 via a universal joint 84. The other end portion of the intermediate shaft 86 is connected, via a universal joint 88, an end portion of the steering shaft 24 that is opposite to the above-described end portion to which the steering wheel 20 is attached.

Figure 2:
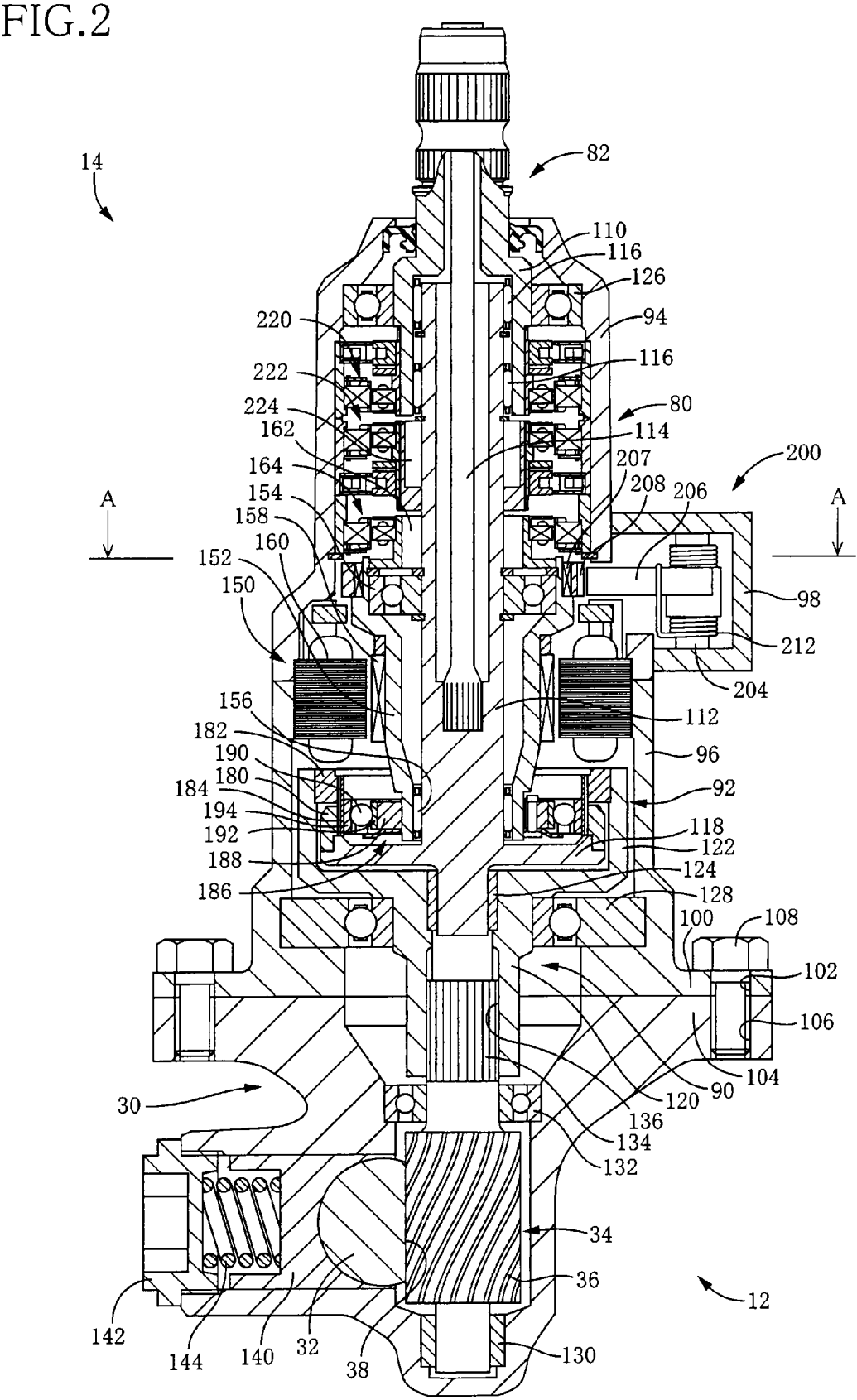
FIG. 2 is a cross sectional view showing a VGRS actuator as a movement-amount variably transmitting device that is shown in FIG. 1.

FIG. 2 shows a cross section of the VGRS actuator 14. The VGRS actuator 14 is constructed to include the housing 80, the input shaft 82 provided rotatably relative to the housing 80, the output shaft 90 provided rotatably relative to the housing 80, and a movement-amount variably transmitting mechanism 92 that is capable of changing a rotation ratio as a ratio between rotations of the respective input and output shafts 82, 90 while transmitting the rotation of the input shaft 82 to the output shaft 90. The housing 80 is constituted by three sub-housings (an upper housing 94, a lower housing 96 and a locking-mechanism-portion housing 98) that are assembled. The lower housing 96 has a flange portion 100 in which faster-receiving holes 102 provided in respective four positions that are equi-angularly positioned on a circumference. The flange portion 100 is attached to a frame portion 104 provided in the housing 30 of the wheel turning device 12 such that a flange surface of the flange portion 100 is in contact with a frame surface of the frame portion 104. The frame portion 104 has four internally threaded holes 106 positioned in respective positions corresponding to the respective four faster-receiving holes 102, so that the flange portion 100 and the frame portion 104 are fastened to each other through bolts 108 as fasteners while each of the faster-receiving holes 102 and a corresponding one of the internally threaded holes 106 are aligned with each other. With the housing 80 of the VGRS actuator 14 being thus fixed to the housing 30 of the wheel turning device 12, the VGRS actuator 14 is fixed to the wheel turning device 12, whereby the housing 80 is unrotatable relative to the vehicle body.

The input shaft 82 is constituted by an upper shaft 110, a lower shaft 112 and a torsion bar 114 that are integral with one another. The upper shaft 110 includes an extending portion that extends out from an upper portion of the housing 80, and a serration is formed in an outer periphery of the extending portion. The upper shaft 110 is connected, at the extending portion formed with the serration, to the universal joint 84, so that the rotation is inputted from the operating device 10 to the upper shaft 110. The upper shaft 110 has a stepped bore having a lower portion that provides a large diameter portion in which the lower shaft 112 is introduced. Bearings 116 are interposed between an inner circumferential surface of the large diameter portion of the upper shaft 110 and an outer circumferential surface of the lower shaft 112, whereby the upper shaft 110 and the lower shaft 112 are rotatable relative to each other. The lower shaft 112 includes a flange portion 118 provided by its lower portion, and has a blind hole which opens at its upper end portion and which extends in the axial direction. The torsion bar 114 is held in serration engagement at one of its opposite end portions with a bottom portion of the blind hole of the lower shaft 112, and is held in serration engagement also at the other end portion with an upper end portion of the upper shaft 110. Owing to such a construction, the input shaft 82 allows twisting of the torsion bar 114, so that the input shaft 82 per se is twisted by an amount corresponding to an amount of the twisting of the torsion bar 114.

The output shaft 90 includes a shaft portion 120 provided by its lower portion, and an annular portion 122 located on an upper side of the shaft portion 120. The annular portion 122 is formed integrally with the shaft portion 120, and has a diameter larger than that of the shaft portion 120. The flange portion 118 of the lower shaft 112 constituting the input shaft 82 is positioned along a flange portion of the output shaft 90 interconnecting the annular portion 122 and the shaft portion 120, so that the flange portion 118 is surrounded by the annular portion 122. The shaft portion 120 is hollow, and a lower end portion of the lower shaft 112 constituting the input shaft 82 is introduced in an upper portion of a hole of the shaft portion 120. Between an outer circumferential surface of the lower end portion of the lower shaft 112 and an inner circumferential surface of the hole of the shaft portion 120, there is interposed a bushing 124 such that the lower shaft 112 and the shaft portion 120 is rotatable relative to each other. The upper shaft 110 constituting the input shaft 82 is rotatably held at its outer periphery by the upper housing 94 via a bearing 126, while the shaft portion 120 of the output shaft 90 is rotatably held at its outer periphery by the lower housing 96 via a bearing 128. Owing to the construction as described above, the input shaft 82 and the output shaft 90 are disposed coaxially with each other, and are rotatable relative to each other and relative to the housing 80.

The pinion shaft 34 as an input shaft of the wheel turning device 12 is held, at its portion that is lower than the pinion 36, by the housing 30 via a bushing 130, and is held, at its portion that is higher than the pinion 36, by the housing 30 via a bearing 132, so that the pinion shaft 34 is provided rotatably relative to the housing 30. An outer serration 134 is formed in an upper end portion of the pinion shaft 34, while an inner serration 136 is formed in a lower end portion of the shaft portion 120 of the output shaft 90. Thus, the output shaft 90 and the pinion shaft 34 are held in serration engagement with each other, in a state in which the VGRS actuator 14 is attached to the wheel turning device 12. Owing to such a construction, the rotation of the output shaft 90 is transmitted to the pinion shaft 34.

As described above, the steering rod 32 is held by the housing 30, movably in the axial direction. The steering rod 32 is positioned relative to the housing 30 such that the rack 38 formed in the steering rod 32 meshes with the pinion 36 of the pinion shaft 34. In a portion located on a back side of a portion of the steering rod 32 in which the rack 38 is formed, there is provided a mechanism for backing up the steering rod 32. Described in detail, a support member 140 is disposed in a hole provided in the housing 30, for supporting the steering rod 32 from its back side, and a cap 142 is held in thread engagement with an end portion of the hole of the housing 30. A compression coil spring 144 is provided between the support member 140 and the cap 142. Owing to such a construction, the steering rod 32 is backed up, and a suitable meshing of the rack 38 and the pinion 36 with each other is assured.

The movement-amount variably transmitting mechanism 92 employs a harmonic gear mechanism. In the VGRS actuator 14, a motor 150 (electric motor) is provided as a drive power source of the harmonic gear mechanism. A motor shaft 152 as an output shaft of the motor 150 is hollow, and is disposed such that the input shaft 82, described in detail, the lower shaft 112 is introduced in the motor shaft 152 per se.

Between an inner circumferential surface of the motor shaft 152 and an outer circumferential surface of the lower shaft 112, there are interposed bearings 154, 156, so that the motor shaft 152 is held rotatably relative to the lower shaft 112 so as to be rotatable relative to the housing 80. On an outer peripheral portion of the motor shaft 152, a plurality of permanent magnets 158 are fixedly disposed and arranged in a circumferential direction. The permanent magnets 158 constitute a rotor of the motor 150. Meanwhile, a plurality of polar bodies 160 (each provided by a core and a coil wound on the core) are fixedly disposed on an inner surface of the housing 80, so as to be opposed to the permanent magnets 158. Each of the polar bodies 160 serves as a stator pole so that the plurality of polar bodies 160 constitute a stator. Owing to such a construction, the motor 150 serves as a so-called brushless motor. It is noted that a rotational angular position of the rotor, i.e., a rotational position (that can be called also a rotational angle or a rotational phase) of the motor shaft 152, is detected by a resolver 164 that is disposed between an attached ring 162 attached to an upper end portion of the motor shaft 152 and an inner surface of the housing 80. The motor 50 is driven by a drive circuit (not shown in the drawings) under a control by which ones of the polar bodies 160, selected according to the rotational angular position of the rotor, are energized. Further, a rotational velocity of the motor 150, more precisely, a rotational velocity of the motor shaft 152, is controlled also by utilizing a signal indicative of detection made by the resolver 164.

The movement-amount variably transmitting mechanism 92 is constructed to include a stator gear 180 as a first circular spline (first ring gear), a driven gear 182 as a second circular spline (second ring gear), a flexible gear 184 as a flex spline meshing with the stator and driven gears 180, 182, and a wave generator 186 supporting the flexible gear 184 and configured to generate a wave. Hereinafter, there will be described a construction and a function of the movement-amount variably transmitting mechanism 92, by reference to FIG. 3 that is a schematic view showing the movement-amount variably transmitting mechanism 92 as seen in the axial direction.

The stator gear 180 is a ring gear having internal teeth, and is fixed to the input shaft 82, described in detail, to an outer peripheral portion of the flange portion 118 of the lower shaft 112, so that the stator gear 180 is unrotatable relative to the input shaft 82. The driven gear 182 is a ring gear having internal teeth, and is fixed to an upper end portion of an inner peripheral portion of the annular portion 122 of the output shaft 90, so that the driven gear 182 is unrotatable relative to the output shaft 90. The stator gear 180 and the driven gear 182 are disposed coaxially with each other. The stator gear 180 as an input side gear is positioned on a lower side of the driven gear 182 as an output side gear. That is, the stator gear 180 as the input side gear is closer than the driven gear 182 as the output side gear, to a lower portion of the VGRS actuator 14 that provides an output side portion of the VGRS actuator 14. Meanwhile, the driven gear 182 as the output side gear is positioned on an upper side of the stator gear 180 as the input side gear. That is, the driven gear 182 as the output side gear is closer than the stator gear 180 as the input side gear, to an upper portion of the VGRS actuator 14 that provides an input side portion of the VGRS actuator 14. Thus, the stator gear 180 and the driven gear 182 are arranged in the axial direction, as if their respective positions were switched to each other. The number of the teeth of the stator gear 180 and the number of the teeth of the driven gear 182 are different from each other. The number of the teeth of the stator gear 180 is 102, while the number of the teeth of the driven gear 182 is 100. The flexible gear 184 is a ring gear having external teeth, and is relatively thin so as to have a flexibility. The number of the teeth of the flexible gear 184 is 100 as that of the driven gear 182. It is noted that the numbers of the teeth of the gears may be switched, for example, so that the stator gear 180 has 100 teeth while the driven gear 182 has 102 teeth.

The wave generator 186 functions as a generally elliptic-shaped cam, and is constructed to include a generally elliptic-shaped support plate 188 and a bearing 190 that is fitted on an outer peripheral end of the support plate 188. The support plate 188 has an axial hole in its center, and is connected to the motor shaft 152 that is fitted in the axial hole, such that the support plate 188 is unrotatable relative to the motor shaft 152. The bearing 190 is mounted on the support plate 188, with an outer periphery of the support plate 188 being fitted in an inner race 192 of the bearing 190. An outer race 194 of the bearing 190 is relatively thin so as to have a flexibility. The flexible gear 184 is mounted on an outer periphery of the bearing 190 such that the flexible gear 184 is unrotatable relative to the outer race 194 of the bearing 190. The flexible gear 184 is deformed by the wave generator 186 so as to have an elliptic shape. Therefore, the flexible gear 184 meshes, at two portions thereof that lie on or in neighborhood of a long axis of the elliptic shape, with the stator gear 180 and the driven gear 182, while being completely separated, at portions thereof that line on or around a short axis of the elliptic shape, from the stator gear 180 and the driven gear 182.

Upon rotation of the stator gear 180 in a state in which the motor shaft 152 is inhibited from being rotated, the flexible gear 184 is circulated, together with the outer race 194 of the bearing 190, along an ellipse, while being elastically deformed with the meshing portions thereof being changed as the circulation thereof. As a result of the circulation of the flexible gear 184, the driven gear 182, which also meshes with the flexible gear 184, is rotated in the same direction as the rotation of the stator gear 180. Described in detail, in this instance, the driven gear 182 is rotated relative to the stator gear 180 at a rotation ratio of 102/100 that corresponds to a gear ratio between these gears 180, 182. Hereinafter, this rotation ratio will be referred to as "reference rotation ratio" where appropriate.

Figure 3:
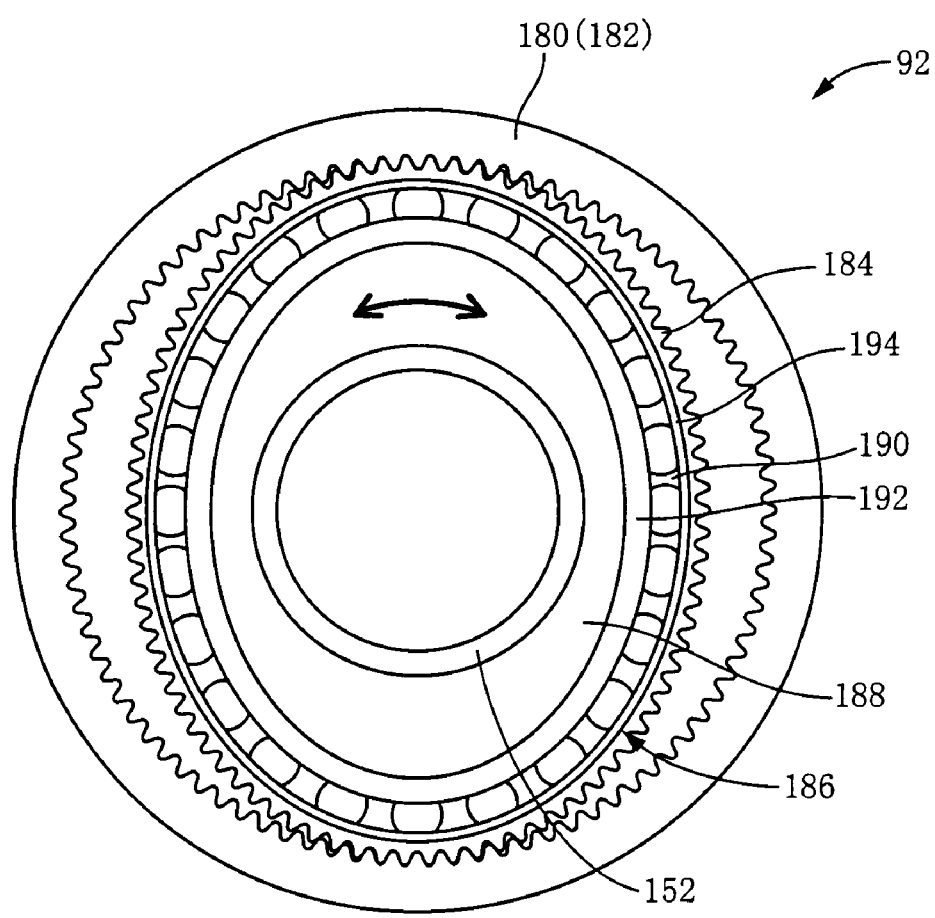
FIG. 3 is a schematic view showing a harmonic gear mechanism as a movement-amount variably transmitting mechanism that is provided in the VGRS actuator of FIG. 2, as seen in an axial direction.

There will be described a case in which the wave generator 186 is rotated by rotating the motor shaft 152, on the assumption that the stator gear 180 is fixed, in the interest of simplifying the description. When the wave generator 186 is rotated, the flexible gear 184 is rotated while being elastically deformed with positions of the meshing being changed as the rotation thereof. Since the stator gear 180 and the driven gear 182 are different from each other with respect to the number of teeth, there is caused, between the stator gear 180 and the driven gear 182, a rotational angle difference (rotational phase difference) whose amount corresponds the difference with respect to the number of teeth. Described specifically, the rotational angle difference whose amount corresponds to two teeth is caused per one rotation of the wave generator 186. Described in detail, when the wave generator 186 is rotated by one rotation in clockwise direction as seen in FIG. 3, the driven gear 182 is rotated relative to the stator gear 180 by an amount corresponding to two teeth in counterclockwise direction as seen in FIG. 3.

Actually, since the stator gear 180 is rotated together with rotation of the input shaft 82, the rotation ratio of the driven gear 182 to the stator gear 180, i.e., a transmission ratio of the movement-amount variably transmitting mechanism 92, is determined according to the amount of the relative rotation of the stator gear 180 and the wave generator 186. Described specifically, when the stator gear 180 and the wave generator 186 are rotated in the same direction, the driven gear 182 is rotated at a rotational velocity that is reduced to be lower than a rotational velocity corresponding to the above-described reference rotation ratio. When the stator gear 180 and the wave generator 186 are rotated in respective directions opposite to each other, the driven gear 182 is rotated at a rotational velocity that is increased to be higher than the rotational velocity corresponding to the above-described reference rotation ratio. Since a degree of the increase or reduction of the rotational velocity is dependent on both of the rotational velocity of the stator gear 180 and the rotational velocity of the wave generator 186, the transmission ratio can be changed in an arbitrary manner, by changing the rotational velocity of the motor 150 depending on the rotational velocity of the stator gear 180. The movement-amount variably transmitting mechanism 92 is thus configured to transmit the rotation of the input shaft 82 to the output shaft 90 and to change a ratio of the rotational amount of the output shaft 90 to the rotational amount of the input shaft 82, in other words, the transmission ratio as a ratio of the rotational velocity of the output shaft 90 to the rotational velocity of the input shaft 82.

Owing to the above-described constructions, in the movement-amount variably transmitting mechanism 92, the lower shaft 112 of the input shaft 82 rotatably disposed in the housing 80 and the stator gear 180 connected to the lower shaft 112 function as a first element, while the output shaft 90 rotatably disposed in the housing 80 and the driven gear 182 connected to the output shaft 90 function as a second element. Further, the flexible gear 184 meshing with the stator gear 180 and the driven gear 182, the wave generator 186 fitted in the flexible gear 184, the motor shaft 152 connected to the wave generator 186 and other components function as a third element. These three elements cooperate to constitute a differential mechanism. As described above, the rotation ratio during the state of inhibition of the rotation of the motor shaft 152 is equal to the above-described reference rotation ratio. During this state, i.e., a state of inhibition of the movement of the third element, the amount of the relative movement of the first and second elements corresponds to the reference rotation ratio, irrespective of the movement amount of the first element.

Further, the VGRS actuator 14 as the movement-amount variably transmitting device is equipped with a motor-shaft rotation locking mechanism 200 (hereinafter simply referred to as "locking mechanism 200" where appropriate) as a third-element-movement inhibiting device capable of inhibiting the rotation of the motor shaft 152 that constitutes the third element. The locking mechanism 200 will be described by reference to FIG. 4 (illustrating only elements disposed within the housing 98) that is a cross sectional view (taken along line A-A in FIG. 2). The locking mechanism 200 is constructed to include an electromagnetically-operated solenoid 202 as a drive source, a lock lever 206 pivotable about a fixed pin 204 that is fixedly disposed on an inner surface of the locking-mechanism-portion housing 98, and a lock holder 208 as a rotatable member that is fitted on an outer periphery of the motor shaft 152 via a tolerance ring 207. The tolerance ring 207 is fitted on the motor shaft 152, and is constructed to include an annular member having a corrugated portion that functions as a spring. The tolerance ring 207 supports the annular lock holder 208 fitted on an outer periphery of the tolerance ring 207, owing to an elastic force of the corrugated portion. The tolerance ring 207 normally inhibits rotation of the lock holder 208 relative to the motor shaft 152, owing to a frictional force generated by the elastic force.

The lock lever 206 is biased by a spring 212 that is disposed with the fixed pin 204 being introduced therein, so as to be pivoted in a direction causing a distal end portion 210 (as an end portion of the lock lever 206) to be moved toward the lock holder 208. The other end portion of the lock lever 206 is connected to the solenoid 202. The solenoid 202 is configured, upon energization thereof, to pivot the lock lever 206 in a direction causing the distal end portion 210 to be moved away from the lock holder 208. The distal end portion 210 of the lock lever 206 functions as an engaging portion, while each of recessed portions 214 formed in an outer periphery of the lock holder 208 functions as an engaged portion, so that the distal end portion 210 is engageable with the recessed portions 214.

Figure 4:
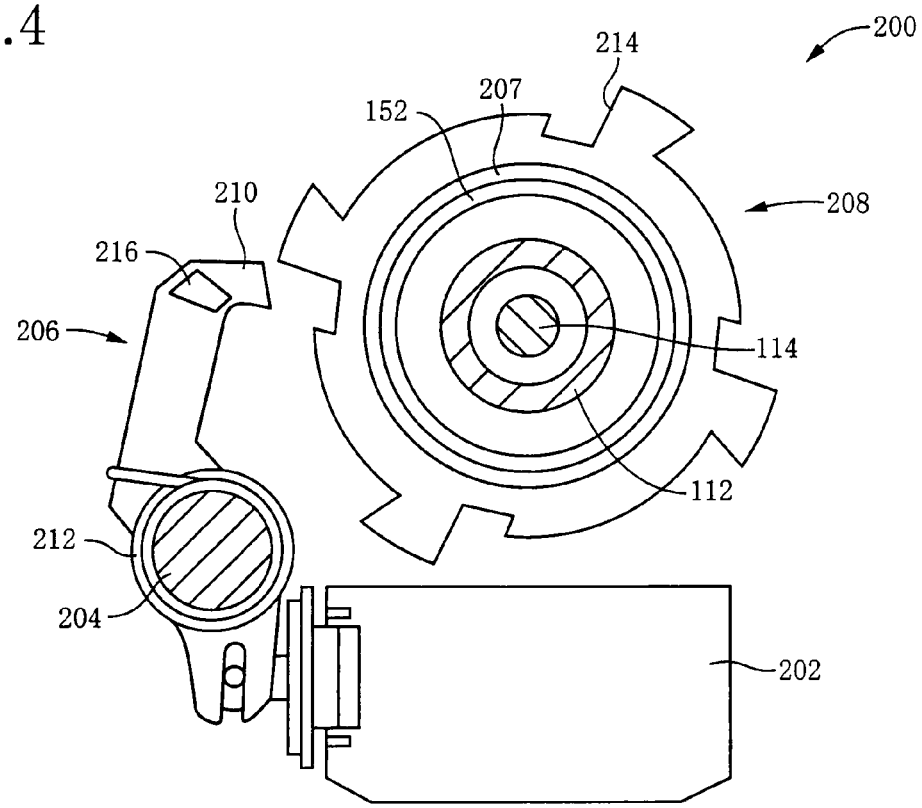
FIG. 4 is cross sectional views (taken along line A-A in FIG. 2) showing a locking mechanism as a third-element-movement inhibiting device that is provided in the VGRS actuator of FIG. 2.
Figure 4:
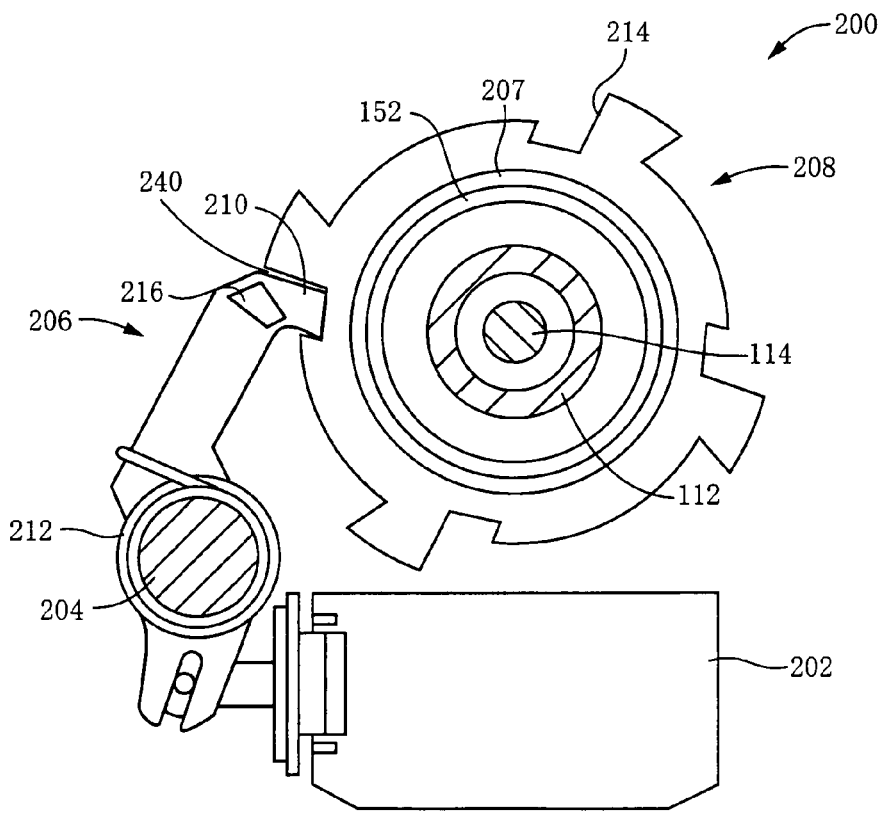

Upon energization of the solenoid 202, the lock lever 206 is pivoted against a biasing force generated by the spring 212, whereby the engagement of the distal end portion 210 of the lock lever 206 and the recessed portion 214 of the lock holder 208 is released thereby allowing the rotation of the motor shaft 152 (see FIG. 4 (*a*)). Upon deenergization of the solenoid 202, the lock lever 206 is engaged at the distal end portion 210 with the recessed portion 214 by the biasing force of the spring 212, thereby inhibiting the rotation of the motor shaft 152 (see FIG. 4 (*b*)). While the rotation of the motor shaft 152 is being inhibited, the transmission of the rotation is made according to the above-described reference rotation ratio.

There will be described a case in which a movement force acts on the motor shaft 152 to force the motor shaft 152 to be rotated during inhibition of the rotation of the motor shaft 152 by the above-described locking mechanism 200. When the movement force forcing the motor shaft 152 to be rotated is larger than the frictional force acting between the tolerance ring 207 and the lock holder 208, the motor shaft 152 is allowed to be rotated even in the state in which the locking mechanism 200 is activated to inhibit the rotation of the motor shaft 152. Owing to such a construction, the VGRS actuator 14 has a third-element-movement allowing mechanism configured to allow the movement of the third element by effect of the movement force even during the inhibition of the movement of the third element by the third-element-movement inhibiting device, when an amount of the movement force acting on the third element becomes larger than a threshold. That is, in the present VGRS actuator 14, the third-element-movement allowing mechanism is constituted to include the tolerance ring 207. Further, the present steering system includes a third-element-movement inhibition cancelling device configured to cancel the inhibition of the movement of the third element made by the third-element-movement inhibiting device, since the VGRS actuator 14 has the third-element-movement allowing mechanism.

In the distal end portion 210 of the lock lever 206, there is provided a distortion gage 216 that is configured to detect an amount of deformation of the lock lever 206 that could be caused by an interaction of the lock lever 206 and the lock holder 208. In the present steering system, it is therefore possible to estimate, based on the deformation amount of the lock lever 206, an acting force acting between the lock lever 206 and the lock holder 208 when the lock lever 206 and the lock holder 208 are engaged with each other. Thus, the VGRS actuator 14 is arranged to have an acting force detector configured to detect the acting force, which acts between the lock lever 206 and the lock holder 208 according to the movement force forcing the motor shaft 152 to be rotated.

Further, the VGRS actuator 14 has two resolvers 220, 222 in addition to the above-described resolver 164. The resolver 220 is provided between the upper shaft 110 (in which an upper end portion of the torsion bar 114 is fitted) and an inner surface of the housing 80, so as to function as a detector for detecting a rotational angular position of the upper shaft 110.

The resolver 222 is provided between an attached ring 224 that is fixedly provided in an outer peripheral portion of the lower shaft 112 (in which a lower end portion of the torsion bar 114 is fitted) and the inner surface of the housing 80, so as to function as a detector for detecting a rotational angular position of the lower shaft 112. It is possible to detect, from signals indicative of detections made by these two resolvers 220, 222, an amount of a relative rotational displacement of the upper shaft 110 and the lower shaft 112 as an amount of a relative displacement of the upper and lower end portions of the torsion bar 114. In the steering system, the operating force (operating torque, described in detail) applied to the steering wheel 20 is estimated based on the relative rotational displacement amount, i.e., an amount of twisting deformation of the torsion bar 114. Thus, the present steering system is arranged to have an operating force detector configured to detect the operating force of the steering wheel 20 based on the above-described relative displacement amount of the upper and lower end portions of the torsion bar 114. The operating force detector is constructed to include the torsion bar 114 serving as a deformable member and a relative-displacement amount sensor that is constituted by the resolvers 220, 222 serving as an end-portion displacement amount sensor and another end-portion displacement amount sensor. In other words, the operating force detector is provided in the VGRS actuator 14, and is constructed to include the torsion bar 114 serving as the deformable member that is disposed between the steering wheel 20 and the stator gear 180 constituting the first element, and a deformation amount sensor configured to detect the twisting deformation amount of the torsion bar 114. It is possible to estimate, based on the detection signals supplied from the resolvers 220, 222, also a direction in which the steering wheel 20 is operated.

The above-described resolver 222 is capable of detecting a rotational angle of the stator gear 180 connected to the lower shaft 112, based on the detected rotational angular position of the lower shaft 112. The wheel-turning amount sensor 54 provided in the wheel turning device 12 is capable of detecting a rotational angle of the pinion shaft 34, i.e., a rotational angle of the driven gear 182, based on the detected movement amount of the steering rod 32. Therefore, from detection signals supplied from the resolver 222 and the wheel-turning amount sensor 54, it is possible to detect a relative rotational angle of the stator gear 180 and the driven gear 182 as the amount of the relative movement of the first and second elements. Thus, the present steering system is arranged to have a relative-movement amount detector configured to detect the amount of the relative movement of the first and second elements.

(B) Controls of Steering System

The present steering system constructed as described above is controlled by the ECU 16, which is constituted principally by a computer. To the ECU 16, there are connected various sensors such as the above-described operation angle sensor 28, wheel-turning amount sensor 54, resolvers 164, 220, 222, distortion gage 216 and wheel velocity sensors 230 provided in the wheels (only one of the wheel velocity sensors 230 provided in one of the wheels 46 is shown in FIG. 1). Further, the ECU 16 has drive circuits (drivers) for driving the motor of the assisting mechanism 52 of the wheel turning device 12, the motor 150 of the VGRS actuator 14 and the solenoid 202 of the locking mechanism 200, and is constructed such that the computer is configured to control the motor of the assisting mechanism 52, motor 150 and solenoid 202 through the drive circuits.

i) Basic Controls

The ECU 16 executes two controls as basic controls. One of the two controls is a control (hereinafter referred to as "transmission ratio control" where appropriate) that relates to the above-described movement-amount variably transmitting mechanism 92 included in the VGRS actuator 14. As described above, the VGRS actuator 14 has the movement-amount variably transmitting mechanism 92 configured to change the transmission ratio γ, i.e., a ratio of the rotational amount of the pinion shaft 34 of the wheel turning device 12 to the rotational amount of the steering shaft 24, and executes a transmission ratio control for controlling the transmission ratio γ. Specifically described, a running speed v of the vehicle is estimated based on wheel velocities detected by the wheel velocity sensors 230 provided in the respective wheels, and the movement-amount variably transmitting mechanism 92 (rotational direction and rotational velocity of the motor 150, described in detail) is controlled so as to establish the transmission ratio γ corresponding to the estimated running speed v.

Figure 5:
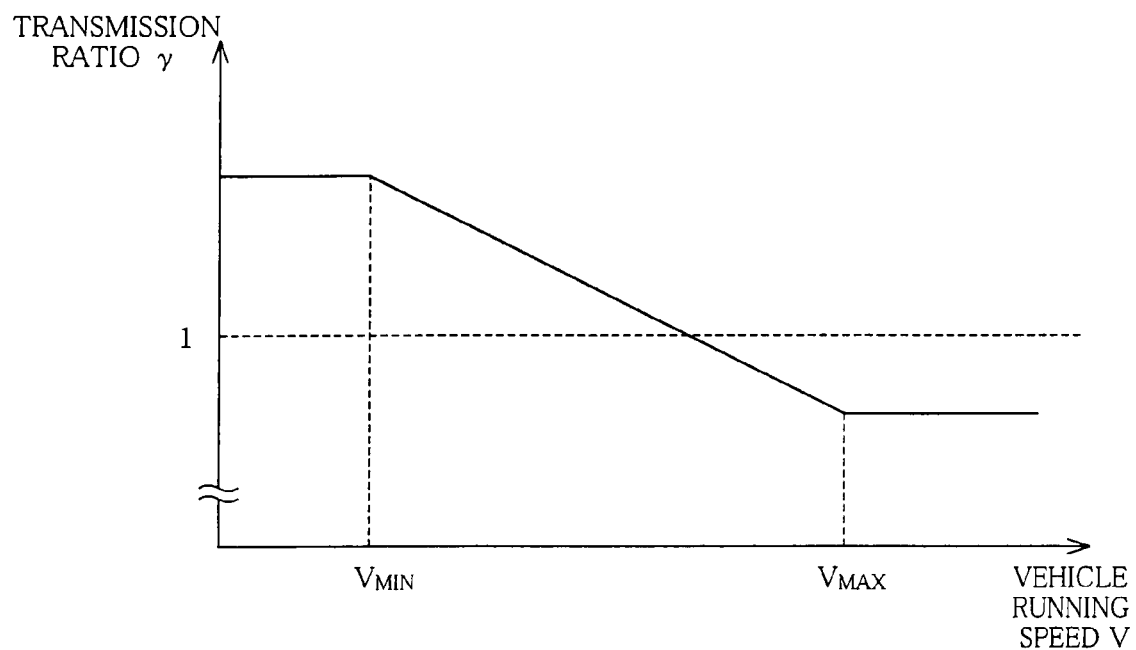
FIG. 5 is a graph showing a relationship between a vehicle running speed and a transmission ratio established in the movement-amount variably transmitting device during execution of a transmission ratio.

Described more in detail, as shown in FIG. 5, while the running speed v of the vehicle is within a range between a controllable minimum speed $v_{MIN}$ and a controllable maximum speed $v_{MAX}$, the transmission ratio γ is reduced with increase of the running speed v and is increased with reduction of the running speed v. Further, since the rotational velocity dφ of the motor shaft 152 corresponding to the transmission ratio γ is determined according to the rotational velocity of the stator gear 180, a target value of the rotational velocity dφ of the motor shaft 152 is determined by a calculation made based on the rotational velocity dδ of the steering wheel 20 that is estimated based on the operating angle of the steering wheel 20 detected by the operation angle sensor 28 in the present transmission ratio control. Then, a command indicative of the determined target value of the rotational velocity dφ is issued to the drive circuit. The motor 150 is controlled, by the drive circuit, based on the rotational angular position of the motor shaft 152 detected by the resolver 164, such that the motor shaft 152 is rotated at the target value of the rotational velocity dφ that is indicated by the command. Owing to such a control, the transmission ratio γ corresponding to the vehicle running speed v is established. According to the present transmission ratio control, when the vehicle runs fast, the wheel turning amount of the steerable wheel 46 is reduced relative to the operating angle (operating amount) of the steering wheel 20 so as to improve a running stability of the vehicle. When the vehicle runs slowly, the wheel turning amount of the steerable wheel 46 is increased relative to the operating angle of the steering wheel 20 so as to facilitate the steering operation.

Figure 6:
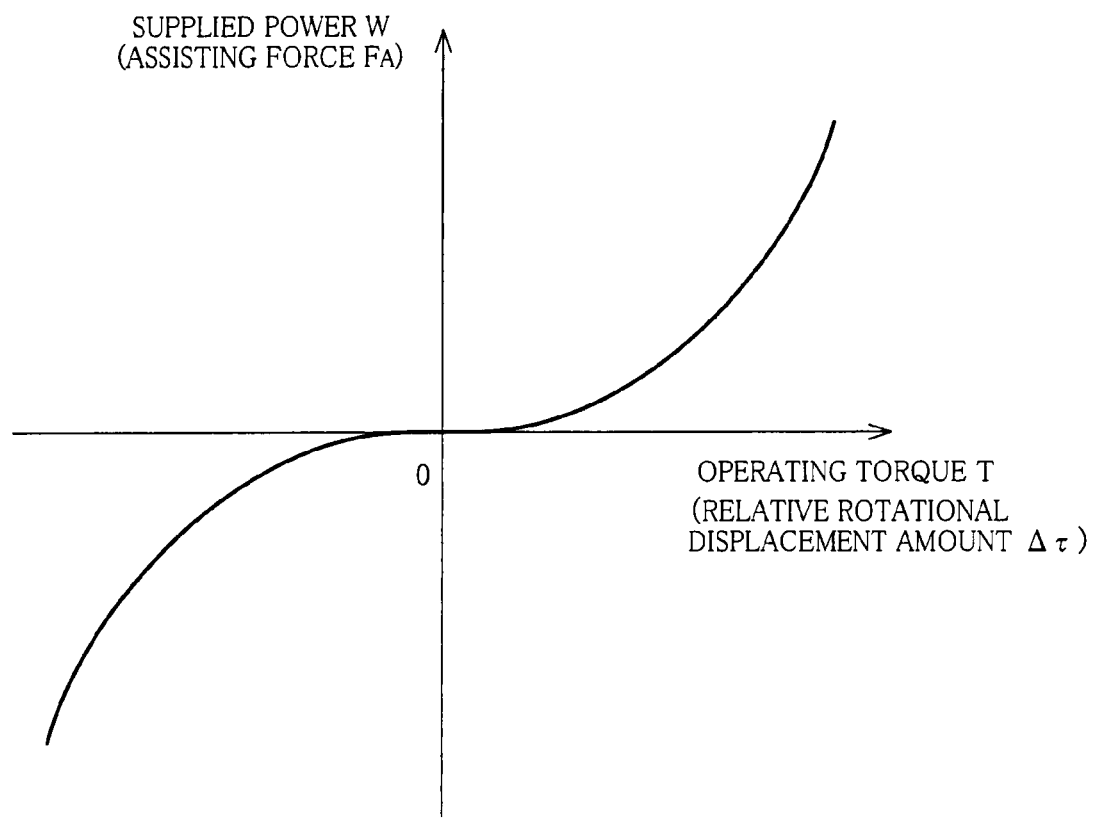
FIG. 6 is a graph showing a relationship between an operating torque and an assisting force during execution of an assisting control for assisting a wheel turning force.

Another one of the controls executed by the ECU 16 is a control (hereinafter referred to as "assisting control" where appropriate) relating to the above-described assisting mechanism 52 of the wheel turning device 12. The ECU 16 estimates the operating torque T as the operating force applied to the steering wheel 20, based on the relative rotational displacement amount Δτ (twisting deformation amount of the torsion bar 114) of the upper and lower end portions of the torsion bar 114 detected by the resolvers 220, 222, and controls the assisting mechanism 52, described in detail, controls an electric power W that is to be supplied to the electric motor included in the assisting mechanism 52, such that the assisting force $F_A$ corresponding to the estimated operating torque is generated. The supplied electric power W or assisting force $F_A$ is set depending on the operating torque T or relative rotational displacement amount Δτ, as shown in FIG. 6. Thus, the supplied electric power W is determined depending on a current value of the relative rotational displacement amount $\Delta\tau$, and a command indicative of a determined value of the supplied electric power W is issued to the drive circuit for driving the electric motor, so that the drive circuit is operated to supply the determined value of the supplied electric power W to the electric power. Owing to such a control, the turning of the wheel is assisted according to the operating torque T. Described specifically, when the relative rotational displacement amount $\Delta\tau$ becomes large with increase of twisting of the torsion bar 114, it is estimated that the operating torque T is large so that a relatively large amount of the electric power W is supplied to the electric motor whereby the assisting force $F_A$ generated by the assisting mechanism 52 is made large. When the relative rotational displacement amount $\Delta\tau$ becomes small with reduction of twisting of the torsion bar 114, it is estimated that the operating torque T is small so that a relatively small amount of the electric power W is supplied to the electric motor whereby the assisting force $F_A$ generated by the assisting mechanism 52 is made small.

ii) First Failure Control

In event of a failure disenabling the motor 150 from rotating the motor shaft 152 constituting the third element, the ECU 16 executes a first failure control in place of the above-described transmission ratio control. This first failure control is a third-element-movement inhibiting control, i.e., a control executed for inhibiting the rotation of the third element by operating the locking mechanism 200 as the above-described third-element-movement inhibiting device, described in detail, by locking the motor shaft 152 with deenergization of the solenoid 202. Specifically, the failure disenabling the motor 150 from rotating the motor shaft 152 corresponds to, for example, a case in which the drive force cannot be applied to the motor shaft 152 due to disconnection or the like, and a case in which the motor 150 becomes unable of generating the drive force as a result of activation of a protection circuit in response to an excessively large load applied to the motor 150. In such cases, the motor shaft 152 is allowed to be relatively freely rotated, whereby the wave generator 186 is allowed to be freely rotated in the movement-amount variably transmitting mechanism 92. Therefore, in such cases, the transmission of the rotation between the stator gear 180 and the driven gear 182 could not be appropriately performed. For coping with such a situation, the first failure control is executed in the present steering system.

Described specifically, the ECU 16 monitors a state of supply of the electric power to the motor 150 in the drive circuit driving the motor 150, and detects disconnection of the motor 150 and overload to the motor 150, based on an outcome of the monitoring, so that supply of the electric power to the solenoid 202 is stopped upon detection of the disconnection or the overload, whereby the rotation of the motor shaft 152 is inhibited. By such an execution of the first failure control, the rotation ratio of the driven gear 182 to the stator gear 180 is fixed to the reference rotation ratio, whereby the turning of the wheel is performed at a fixed value of the transmission ratio γ that corresponds to the reference rotation ratio.

iii) Second Failure Control

As a factor causing the overloading of the motor 150, there is a state in which as if the elements of the movement-amount variably transmitting mechanism 92 in the form of the stator gear 180, driven gear 182, flexible gear 184 (engaged with the gears 180, 182) and wave generator 186 are stuck to one another, in other words, a relative-rotation disabled state (as a kind of "relative-movement disabled state") in which the stator gear 180 and the driven gear 182 are not rotatable relative to each other. The failure accompanied by the relative-rotation disabled state could be caused, for example, by entrance of foreign object into the movement-amount variably transmitting mechanism 92. In the relative-rotation disabled state, even if the motor shaft 152 is intended to be rotated at a rotational velocity corresponding to the transmission ratio, the motor shaft 152 cannot be rotated at the rotational velocity, so that the motor 150 is overloaded if such a state is continued.

In event of occurrence of the failure accompanied by the relative-rotation disabled state, if the above-described first failure control is executed to inhibit the rotation of the motor shaft 152, the movement-amount variably transmitting mechanism 92 suffers a so-called deadlock impeding the steering operation. For coping with such a problem, the ECU 16 executes a second failure control. In this second failure control, there are executed a third-element-movement inhibition releasing control, i.e., a control for releasing the inhibition of the rotation of the motor shaft 152 that is made by the locking mechanism 200, and a control for avoiding the motor 150 from providing a resistance against the rotation of the motor shaft 152. Specifically described, the electric power is supplied to the solenoid 202, and the motor 150 is placed, by the drive circuit, in a free state (hereinafter referred to as "motor free state" where appropriate), i.e., in a state in which the input terminals of the motor 150 are electrically disconnected from the electric power source while being opened from each other, so that the electric power is not supplied to the motor 150 while a force based on an electromotive force is not generated by the motor 150.

The ECU 16 executes the second failure control upon satisfaction of any one of three conditions. A first one (hereinafter referred to as "first condition" where appropriate) of the conditions is that an amount of the movement force acting on the third element becomes larger than a predetermined threshold. Specifically described, the first condition is that, when the lock lever 206 is engaged with the lock holder 208, an acting force AF as a force acting therebetween as a result of action and reaction thereof is larger than a predetermined threshold $AF_0$. As described above, in the present steering system, since the VGRS actuator 14 has the acting force detector in the form of the distortion gage 216, the acting force AF is detected based on the detection signal supplied from the distortion gage 216. It is determined whether the first condition is satisfied or not based on the detected acting force AF, and then the second failure control in place of the first failure control is executed when it is determined that the first condition is satisfied.

A second one (hereinafter referred to as "second condition" where appropriate) of the conditions is that an amount of the operating force applied to the steering operation member becomes larger than a predetermined threshold. When the steering wheel 20 is intended to be rotated by the vehicle operator in event of a deadlock occurring in the movement-amount variably transmitting mechanism 92, there is a high possibility that the operating force applied to the steering wheel 20 becomes large. The present steering system has the above-described operating force detector which is constructed to include the two resolvers 220, 222 provided between the steering wheel 20 and the stator gear 180, namely, which is based on the relative rotational displacement amount $\Delta\tau$ of the torsion bar 114, as described above, so that it is determined whether the second condition is satisfied or not, based on an outcome of the detection made by the operating force detector. Described specifically, when an amount of the operating torque T as the detected operating force is larger than a predetermined threshold $T_0$, the occurrence of the deadlock is recognized so that it is determined whether the second condition is satisfied or not based on the recognition. The second failure control is executed when it is determined that the second condition is satisfied.

A third one (hereinafter referred to as "third condition" where appropriate) of the conditions is that the first element and the second element are not substantially moved relative to each other. Specifically described, the third condition is that a rotational amount $\Delta\theta_S$ of the stator gear 180 constituting the first element and a rotational amount $\Delta\theta_D$ of the driven gear 182 constituting the second element are substantially equal to each other. Each of the rotational amounts $\Delta\theta_S$, $\Delta\theta_D$ is a rotational amount within a certain short length of time and accordingly can be considered as a rotational velocity. For example, when the VGRS actuator 14 simply suffers disconnection of the motor 150, for example, the rotation ratio of the driven gear 182 to the stator gear 180 corresponds to the reference rotation ratio. However, during the relative-rotation disabled state, the rotation ratio is constantly about 1/1. The third condition is a condition established with this fact being taken into account. It is noted that the locking mechanism 200 of the present steering system is provided with a play 240 between the lock lever 206 and the lock holder 206, described in detail, between the distal end portion 210 of the lock lever 206 and each recessed portion 214 of the lock holder 208, so as to allow the rotation of the third element by an amount within a predetermined threshold range that corresponds to the play 240 while inhibiting the rotation of the third element. According to such a construction, in the present VGRS actuator 14, even in the relative-rotation disabled state, the rotation ratio of the driven gear 182 to the stator gear 180 is detectable owing to the rotation by the amount corresponding to the play 240.

Described specifically, firstly, the rotational amount $\Delta\theta_S$ of the stator gear 180 is recognized based on the detected value detected by the resolver 222 that is capable of detecting the rotational angle of the stator gear 180, and the rotational amount $\Delta\theta_D$ of the driven gear 182 is recognized based on the detected value detected by the wheel turning amount sensor 54 that is capable of detecting the rotational angle of the driven gear 182. Then, on condition that the rotational amount $\Delta\theta_S$ of the stator gear 180 is not 0 (zero), it is determined whether a difference between the rotational amount $\Delta\theta_s$ of the stator gear 180 and the rotational amount $\Delta\theta_D$ of the driven gear 182 is smaller than a predetermined threshold $\Delta\theta_0$ (that is set to a value extremely close to 0) or not. When the difference is smaller than the predetermined threshold $\Delta\theta_0$, it is determined that the third condition is satisfied whereby the second failure control is executed.

As described above, when the first failure control is executed, the ECU 16 is configured to determine whether the failure is caused by the relative-rotation disabled state or not, by determining (A) whether the acting force acting between the engaging portion and the engaged portion of the locking mechanism exceeds the predetermined threshold, (B) whether the operating force applied to the steering operation member exceeds the predetermined threshold, and (C) whether the first and second elements are substantially movable relative to each other. That is, when at least one of the above-described third conditions is satisfied, it is determined that the transmitting mechanism 92 is placed in the relative-rotation disabled state, and the ECU 16 executes the second failure control. It is noted that either of the determinations regarding the above-described first and second conditions can be regarded as a determination as to whether the amount of the movement force acting on the third element exceeds a predetermined threshold or not.

Owing to the second failure control executed as described above, in the VGRS actuator 14, there is established a state in which as if the input shaft 82 and output shaft 90 were integral with each other so that the rotations of the input shaft 82 and output shaft 90 are allowed to be rotated thereby making it possible to appropriately perform the steering operation. Further, in this state, it is possible to avoid the motor 150 from being overloaded. In the second failure control, the third-element-movement inhibiting device is controlled to release the inhibition of the movement of the third element, which is made by the third-element-movement inhibiting device. Therefore, the present steering system is given the third-element-movement inhibition cancelling device owing to an arrangement in which the ECU 16 as the control device is configured to execute the second failure control, described in detail, the third-element-movement inhibition releasing control. Since there are three conditions as conditions for initiation of the second failure control, as described above, it is possible to consider that the present steering system has three kinds of third-element-movement inhibition cancelling devices. Further, the third-element-movement inhibition releasing control is a control for establishing a state in which the movement of the third element is not inhibited. In this sense, the third-element-movement inhibition releasing control is a kind of third-element-movement non-inhibiting-state establishing control.

iv) Modified Manner of Execution of Second Failure Control

The above-described second failure control is a control executed for establishing a state in which the movement of the third element is not inhibited by the third-element-movement inhibiting device, by releasing the inhibition of the movement of the third element after the movement of the third element has been once inhibited by the third-element-movement inhibiting device. However, in place of such an execution of the control, it is also possible to directly execute the second failure control in the relative-rotation disabled state. For example, the above-described determination regarding the third condition, i.e., the determination as to whether the first and second elements are substantially movable relative to each other, may be made also before activation of the locking mechanism 200. This is because, as described above, the rotation ratio of the driven gear 182 to the stator gear 180 is constantly about 1/1 during the relative-rotation disabled state. Therefore, it is also possible to always make the determination regarding the third condition in a normal state and to execute the second failure control upon satisfaction of the third condition. That is, also with the thus modified manner of execution of the control, it is possible to carry out the third-element-movement non-inhibiting-state establishing control.

Upon initiation of the second failure control from the normal state, the motor shaft 152 of the third element may be inhibited from being driven, by inhibiting the execution of the transmission ratio control so as to place the motor 150 into the above-described free state. However, since the rotation of the motor shaft 152 is not inhibited, it is not necessary execute a control relating to activation of the locking mechanism 200. It is noted that the transmission ratio control is executed during the normal state so that there is a case in which the rotation ratio of the driven gear 182 to the stator gear 180 is set to 1/1 due to the execution of the transmission ratio control when the vehicle running speed v has a certain value. In view of this, for assuring an accurate recognition of the relative-rotation disabled state, it is preferable to make the determination regarding the above-described third condition by also seeing if the vehicle running speed v is being changed or not.

v) Relationship between Third-Element-Movement Allowing Mechanism and Second Failure Control The present steering system is given, in addition to the third-element-movement inhibition cancelling device provided in the execution of the second failure control, another third-element-movement inhibition cancelling device provided by the arrangement in which the VGRS actuator 14 has the above-described third-element-movement allowing mechanism. As described above, the third-element-movement allowing mechanism has a function of allowing the rotation of the motor shaft 152 relative to the lock holder 208 when the movement force acting on the motor shaft 152 is larger than the frictional force generated by the tolerance ring 207. The movement force is a force which is generated based on the operating force applied to the steering wheel 20 and an input inversely applied from the wheel turning device 12, and which acts on the motor shaft 152, for example, via the stator gear 180 and the driven gear 182. That is, the third-element-movement allowing mechanism is configured to allow the rotation of the motor shaft 152 owing to an effect of the movement force even when the locking mechanism 200 is activated to inhibit the rotation of the motor shaft 152.

In view of those described above, the third-element-movement allowing mechanism and the second failure control are common to each other with respect to function of allowing the rotation of the motor shaft 152, so that it can be considered that the third-element-movement inhibition cancelling device is disposed in a redundant manner in the present steering system. It is noted that the amount of the movement force for overcoming the frictional force generated by the tolerance ring 207 is set to be larger than the above-described predetermined threshold in the determination regarding the first condition and the above-described predetermined threshold in the determination regarding the second condition so that the second failure control is initiated, in general, prior to the allowance of the rotation of the motor shaft 152 by the third-element-movement allowing mechanism. Therefore, in the present steering system, the third-element-movement allowing mechanism is the third-element-movement inhibition cancelling device serving as a backup device that is provided for a fail-safe purpose. However, it may be modified such that the rotation of the motor shaft 152 is allowed by the third-element-movement allowing mechanism, prior to or concurrently with the execution of the second failure control. Further, the present steering system may be modified also such that the third-element-movement allowing mechanism is not provided or such that the second failure control is not executed.

vi) Flows of Controls

Figure 7:
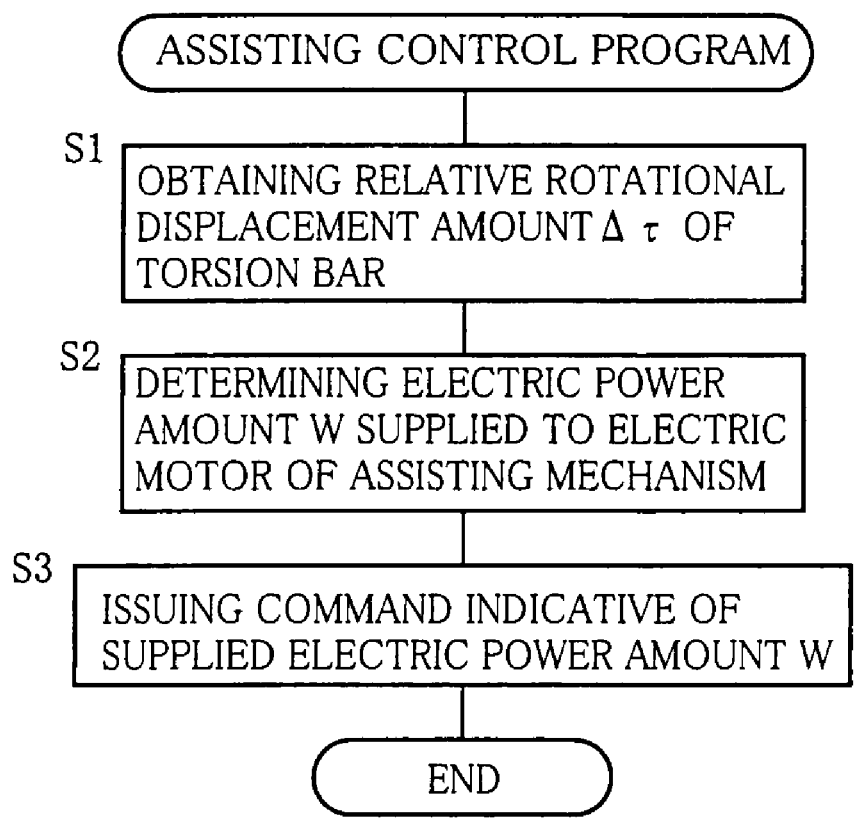
FIG. 7 is a flow chart of an assisting control program executed in the vehicle steering system of the first embodiment.
Figure 8:
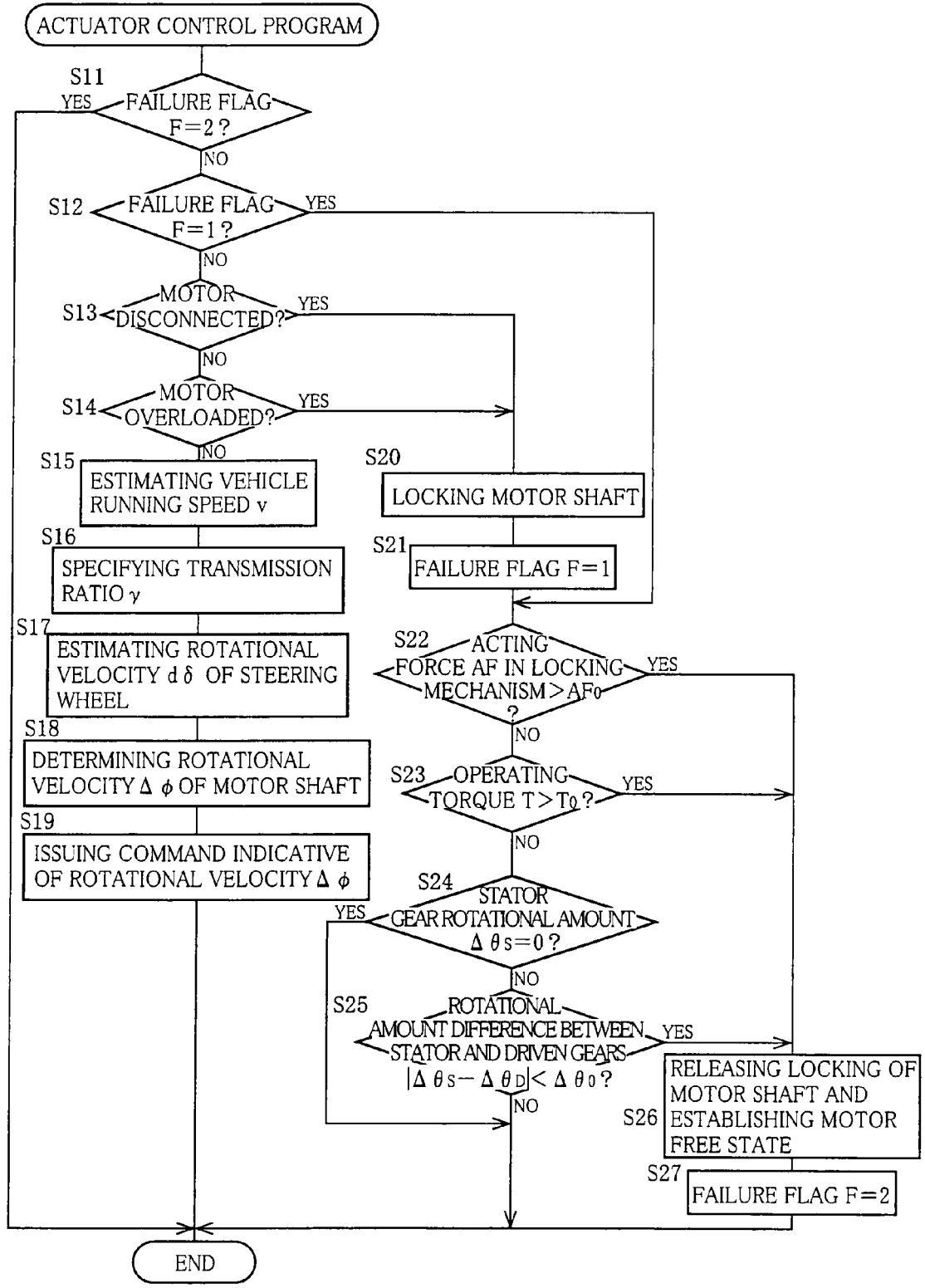
FIG. 8 is a flow chart of an actuator control program executed in the vehicle steering system of the first embodiment.

The above-described assisting control and actuator control are executed in accordance with an assisting control program and an actuator control program that are shown in flow charts of FIGS. 7 and 8, respectively. Each of these control programs is repeatedly executed at a short time interval (e.g., several milliseconds to several tens of milliseconds). Hereinafter, the assisting control and the actuator control (including the transmission ratio control, first failure control and second failure control) will be described by reference to the respective flow charts.

As shown in FIG. 7, in the assisting control for control the assisting force that is to be generated by the assisting mechanism 52 of the wheel turning device 12, step S1 (hereinafter abbreviated to as "S1" as well as the other steps, where appropriate) is first implemented to obtain the relative rotational displacement amount $\Delta\tau$ of the upper and lower end portions of the torsion bar 114 that is detected by the resolvers 220, 222. Then, S2 is implemented to determine the electric power W that is to be supplied to the electric motor of the assisting mechanism 52, based on the relative rotational displacement amount $\Delta\tau$. Next, in S3, a command indicative of the supplied electric power W is issued to the drive circuit. Owing to such a control, in the present steering system, the wheel turning is always assisted according to the operating force applied to the steering wheel 20.

As shown in FIG. 8, a failure flag F is used in the actuator control. The failure flag F is set to 0 (zero) as an initial flag value. When the motor 150 is disconnected or overloaded, the flag value becomes 1 (one). When the transmitting mechanism 92 is placed in the above-described relative-rotation disabled state, the flag value becomes 2 (two).

S13 is implemented to determine whether the motor 150 is disconnected or not. S14 is implemented to determine whether the motor 150 is overloaded. When the motor 150 is neither disconnected nor overloaded, S15 through S19 are implemented to execute the transmission ratio control. That is, the vehicle running speed v is estimated, and the transmission ratio $\gamma$ is recognized based on the estimated vehicle running speed v with reference to the map shown in FIG. 5. Next, the rotational velocity $d\delta$ of the steering wheel 20 is estimated, and the rotational velocity $\Delta\phi$ at which the motor shaft 152 is to be rotated is determined based on the estimated rotational velocity $d\delta$ and the recognized transmission ratio $\gamma$. Then, a command indicative of the determined rotational velocity $\Delta\phi$ is issued to the drive circuit of the motor 150.

When the motor 150 is disconnected or overloaded, S20 is implemented to activate the locking mechanism 200 so as to lock the motor shaft 152. That is, the execution of the first failure control is initiated whereby the rotation of the motor shaft 152 is inhibited. Upon initiation of the first failure control, the failure flag F is set to 1 (one) in S21.

After the failure flag F has been set to 1, S22 through S25 are implemented to make determinations. The determination made in S22 corresponds to the above-described determination regarding the first condition. In S22, it is determined whether the acting force AF acting between the lock lever 206 and the lock holder 208 is larger than the predetermined threshold A or not. The determination made in S23 corresponds to the determination regarding the second condition. In S23, it is determined whether the operating torque T exceeds the predetermined threshold $T_0$ or not. The determinations made in S24 and S25 correspond to the determination regarding the third condition. When the stator gear 180 is being rotated, it is determined whether the difference between the rotational amount $\Delta\theta_S$ of the stator gear 180 and the rotational amount $\Delta\theta_D$ of the driven gear 182 is smaller than the predetermined threshold $\Delta\theta_0$ or not. When any one of the first through third conditions is satisfied, S26 is implemented to operate the locking mechanism 200 to release the locking of the motor shaft 152 and to establish the above-described motor free state by the drive circuit. That is, the execution of the second failure control is initiated. Upon initiation of the second failure control, the failure flag F is set to 2 (two) in S27.

Once after the first failure control has been initiated, the above-described determinations regarding the first through third conditions are repeated as a result of an affirmative determination in S12 while the locking of the motor shaft 152 is being maintained. Once after the second failure control has been initiated, the locking of the motor shaft 152 is held released while the motor free state is maintained as a result of an affirmative determination in S11.

vii) Functional Construction of Control Device

Figure 9:
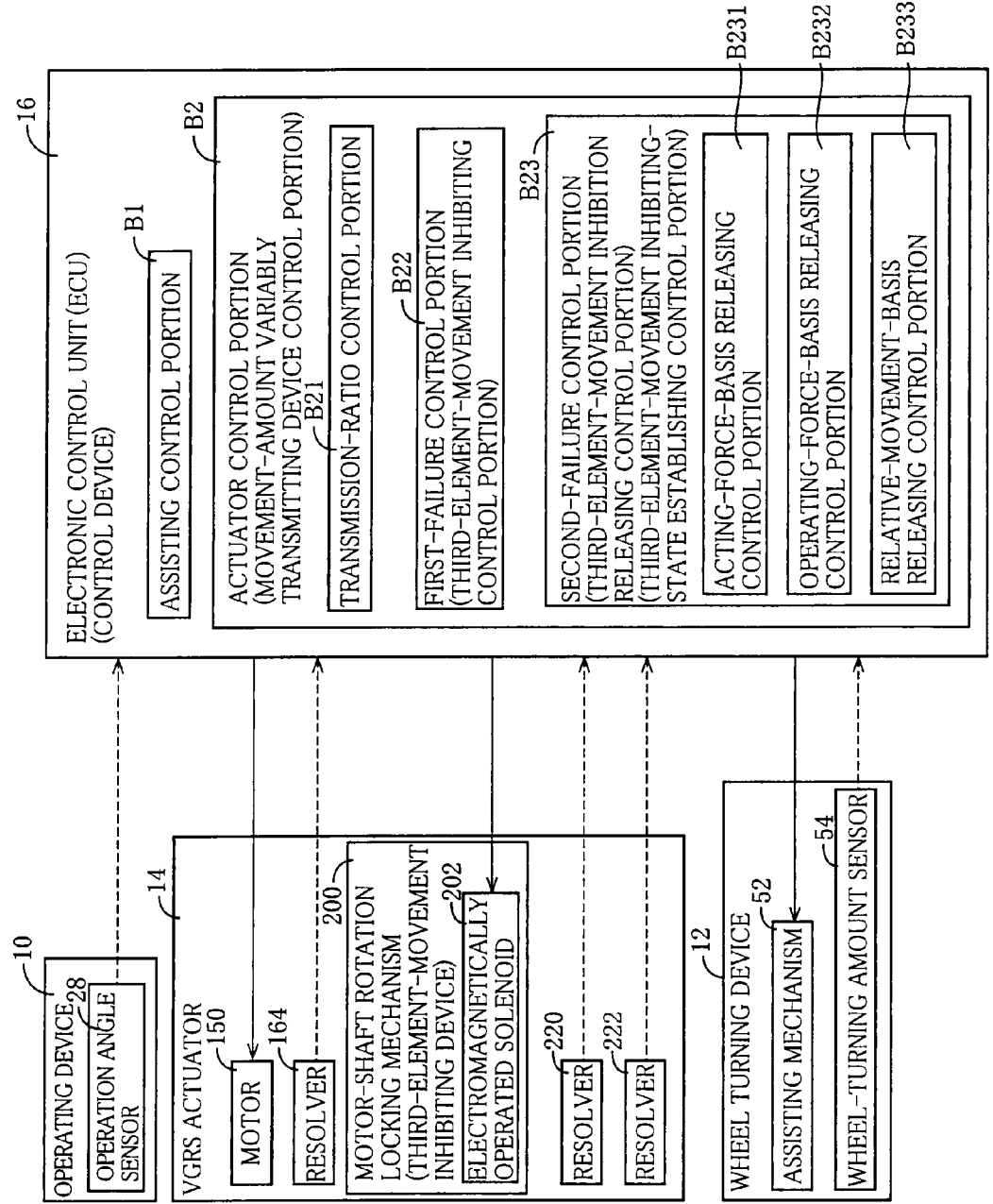
FIG. 9 is a functional block diagram of a control device provided in the vehicle steering system of the first embodiment.

The ECU 16, which is configured to carry out procedures according to the above-described assisting control program and actuator control program, can be considered to have a functional construction as shown in FIG. 9. Described in detail, the ECU 16 has an assisting control portion B1 configured to carry out procedures according to the assisting control program and an actuator control portion B2 as a movement-amount variably transmitting device control portion configured to carry out procedures according to the actuator control program.

Described in detail, the actuator control portion B2 has a transmission-ratio control portion B21 as a functional portion configured to carry out procedures according to S15 through S19 of the actuator control program, a first-failure control portion B22 as a functional portion configured to carry out a procedure according to S20 depending on the determination made in S13 or S14, and a second-failure control portion B23 as a functional portion configured to carry out procedures according to S26 depending on the determination made in any one of S22 through S25. The first-failure control portion B22 is a functional portion configured to cause the locking mechanism 200 to inhibit the rotation of the motor shaft 152 as the third element under a particular situation, and can be considered as a third-element-movement inhibiting control portion. The second-failure control portion B23 is a functional portion configured, in a state in which the rotation of the motor shaft 152 is inhibited, to execute a control for allowing the rotation of the motor shaft 152, by controlling the activation of the locking mechanism 200 in such a manner that releases the inhibition of the rotation of the motor shaft 152, and can be considered as a third-element-movement inhibition releasing control portion. Further, the second-failure control portion B23 can be considered as a kind of third-element-movement non-inhibiting-state establishing control portion as a functional portion configured to establish a state in which the movement of the third element is not inhibited.

Described more in detail, the second-failure control portion B23 can be considered to include three functional portions. One of them is an acting-force-basis releasing control portion B231 configured to release the inhibition of the rotation of the motor shaft 152 based on the determination made in S22, namely, to execute a control for releasing the inhibition of the rotation of the motor shaft 152 when the amount of the acting force acting in the locking mechanism 200 exceeds a predetermined threshold. Another one of them is an operating-force-basis releasing control portion B232 configured to release the inhibition of the rotation of the motor shaft 152 based on the determination made in S23, namely, to execute a control for releasing the inhibition of the rotation of the motor shaft 152 when the amount of the operating force applied to the steering wheel 20 exceeds a predetermined threshold. Then, still another one of them is a relative-movement-basis releasing control portion B233 configured to release the inhibition of the rotation of the motor shaft 152 based on the determination made in S25, namely, to execute a control for releasing the inhibition of the rotation of the motor shaft 152 when the stator gear 180 as the first element and the driven gear 182 as the second element become disabled from being substantially moved relative to each other.

Second Embodiment (A) Construction of Steering System

Figure 10:
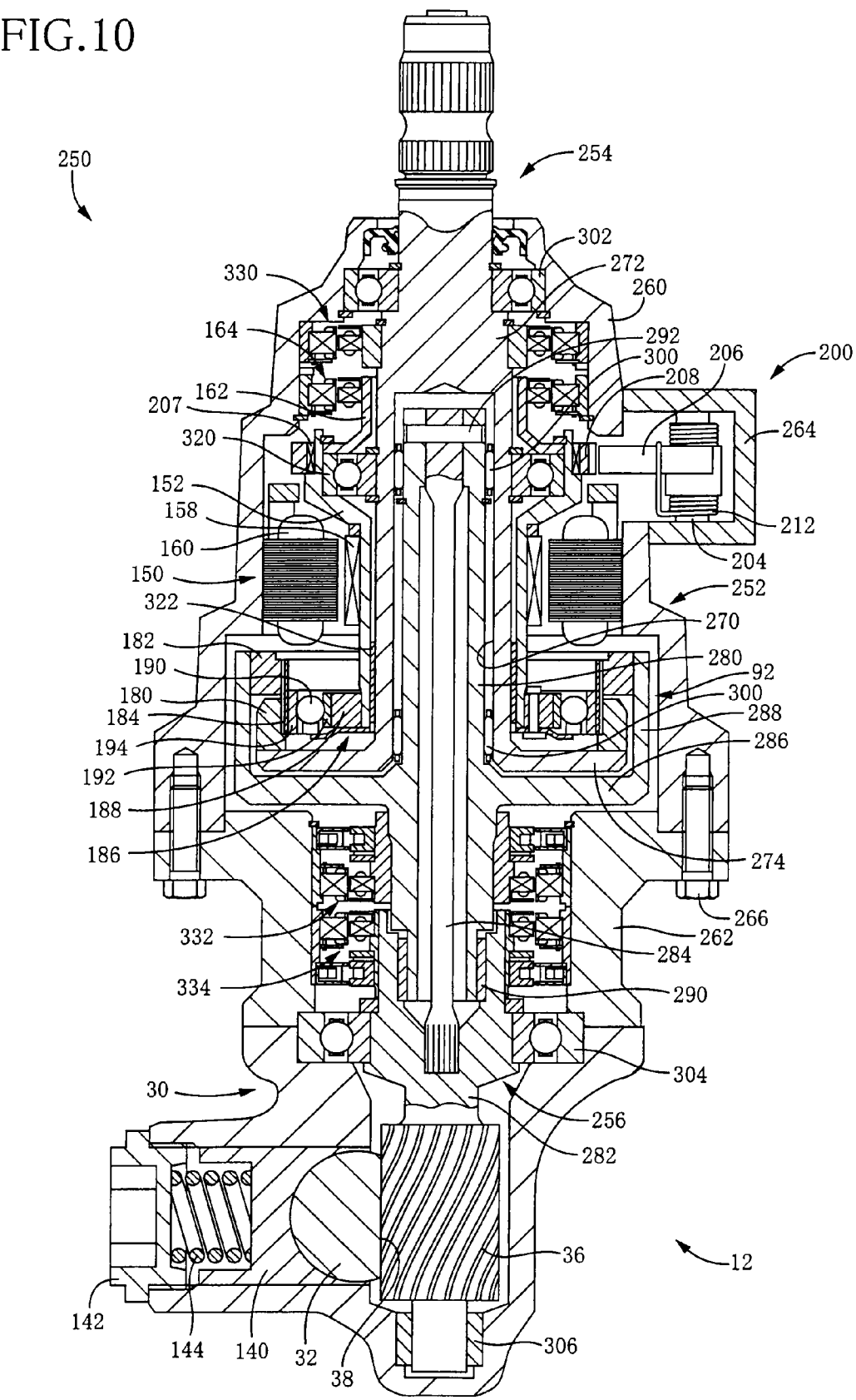
FIG. 10 is a cross sectional view showing a VGRS actuator as a movement-amount variably transmitting device that is provided in a vehicle steering system of a second embodiment of the present invention.

FIG. 10 is a cross sectional view of the movement-amount variably transmitting device in the form of a VGRS actuator that is provided in a steering system of a second embodiment of the present invention. This VGRS actuator 250 is fixedly provided in the wheel turning device 12, like the above-described VGRS actuator 14 provided in the steering system of the first embodiment. Since an overall construction of the present steering system is substantially the same as that of the steering system shown in FIG. 1, description of that is omitted. Further, since the VGRS actuator 250 is constructed to include elements similar or substantially the same as those of the VGRS actuator 14, the same reference signs will be used to identify the similar or substantially the same elements, and description of these elements will be simplified.

Like the VGRS actuator 14 in the first embodiment, the VGRS actuator 250 is constructed to include a housing 252, an input shaft 254, an output shaft 256 and the movement-amount variably transmitting mechanism 92. The housing 252 is constructed to include three sub-housings (an upper housing 260, a lower housing 262 and a locking-mechanism-portion housing 264). The upper housing 260 and the lower housing 262 are fastened to each other through bolts 266 as fasteners, and are easily separable from each other. The lower housing 262 is integral with the housing 30 of the wheel turning device 12, so as not to be easily separable from the housing 30. From a different point of view, the lower housing 262 can be considered as a part of the housing 30 of the wheel turning device 12. That is, the VGRS actuator 250 can be considered as a form in which the housing 252 is integral with the housing 30 of the wheel turning device 12. Owing to such a construction, the VGRS actuator 250 is fixed to the wheel turning device 12, so that the housing 252 is provided in the vehicle body, unrotatably relative to the vehicle body.

The input shaft 254 is configured to have a stepped shaft portion 272 and a flange portion 274. The shaft portion 272 has a blind hole 270 formed to extend from its lower end portion in an axially upward direction. The flange portion 274 is formed integrally with the shaft portion 272, and is contiguous to the lower end portion of the shaft portion 272. The input shaft 254 includes an extending portion that extends out from an upper portion of the housing 252, and a serration is formed in an outer periphery of the extending portion. The input shaft 254 is connected, at the extending portion formed with the serration, to the universal joint 84, so that the rotation is inputted from the operating device 10 to the input shaft 254.

The output shaft 256 is constituted by a main shaft 280, a pinion shaft 282 and a torsion bar 284 that are integral with one another. The main shaft 280 serves as a principal shaft and is located in an upper portion of the output shaft 256. The pinion shaft 282 serves also as an input shaft of the wheel turning device 12 and is located in a lower portion of the output shaft 256. The torsion bar 284 interconnects the main shaft 280 and the pinion shaft 282. The main shaft 280 is hollow, and is formed integrally with a flange portion 286 and an annular portion 288. The flange portion 286 extends from an axially intermediate portion of the main shaft 280 in a direction perpendicular to the axial direction. The annular portion 288 extends from an outer periphery of the flange portion 286 in the axial direction. The pinion shaft 282 has, in its upper portion, a blind hole axially extending from it upper end portion. The pinion 36 is formed in an axially intermediate portion of the pinion shaft 282. A lower end portion of the main shaft 280 is introduced in the blind hole of the pinion shaft 282 via a bushing 290, such that the main shaft 280 and the pinion shaft 282 are rotatable relative to each other. The torsion bar 284, which is disposed inside the main shaft 280, is fixed at its upper end portion to an upper end portion of the main shaft 280 through a pin 292, so that the torsion bar 284 and the main shaft 280 are unrotatable relative to each other. Further, the torsion bar 284 is held in serration engagement with a bottom portion of the blind hole of the pinion shaft 282, so that the torsion bar 284 and the pinion shaft 282 are unrotatable relative to each other. Owing to such a construction, the output shaft 256 allows twisting of the torsion bar 284, so that the output shaft 256 per se is twisted by an amount corresponding to an amount of the twisting of the torsion bar 284.

The upper portion of the main shaft 280 constituting the output shaft 256 is introduced in the blind hole 270 of the input shaft 254, and an bearings 300 are interposed between an inner circumferential surface of the blind hole 270 and an outer circumferential surface of an upper portion of the main shaft 280, so that the input shaft 254 and the main shaft 280 are rotatable relative to each other. The input shaft 254 is rotatably held in an inner surface of the upper housing 260 via a bearing 302. Further, the pinion shaft 282 constituting the output shaft 256 has an intermediate portion that is held by the lower housing 262 and the housing 30 of the wheel turning device 12 via a bearing 304, and a lower end portion that is held by the housing 30 via a bushing 306, so that the pinion shaft 282 is rotatably held by the lower housing 262 and the housing 30. Owing to the construction as described above, the input shaft 254 and the output shaft 256 are disposed coaxially with each other, and are rotatable relative to each other and relative to the housing 252. The wheel turning device 12 including the pinion shaft 282 has a construction that is substantially the same as that of the first embodiment, and description of the construction is omitted.

Like in the first embodiment, the movement-amount variably transmitting mechanism 92 employs a harmonic gear mechanism. In the VGRS actuator 250, the motor 150 is provided as a drive power source of the harmonic gear mechanism. The motor shaft 152 as an output shaft of the motor 150 is hollow, and is disposed such that the input shaft 254 and the output shaft 256 are introduced in the motor shaft 152 per se. Described in detail, the motor shaft 152 is rotatably held by the input shaft 254 via a bearing 320 and a bushing 322, so as to be rotatable relative to the housing 252. Like in the first embodiment, the permanent magnets 158 constituting the rotor are disposed on the outer peripheral portion of the motor shaft 152, while the polar bodies 160 constituting the stator are disposed on the inner surface of the housing 252, so that the motor 150 serves as a so-called brushless motor. Further, like in the first embodiment, the rotational position of the motor shaft 152 is detected by the resolver 164, so that an outcome of the detection made by the resolver 164 is utilized, for example, in a control for selecting ones of the polar bodies 160 that are to be energized and a control for controlling the rotational velocity of the motor 150.

The movement-amount variably transmitting mechanism 92 is constituted to include the stator gear 180, driven gear 182, flexible gear 184 and wave generator 186, like in the first embodiment. The stator gear 180 is fixed to an outer periphery of the flange portion 274 of the input shaft 254, while the driven gear 182 is fixed to the annular portion 288 of the main shaft 280 constituting the output shaft 256. Owing to such a construction, in the movement-amount variably transmitting mechanism 92, the input shaft 254 rotatably provided in the housing 252 and the stator gear 180 connected to the input shaft 254 function as the first element, while the main shaft 280 of the output shaft 256 rotatably provided in the housing 252 and the driven gear 182 connected to the main shaft 280 serve as the second element. The other portions of the movement-amount variably transmitting mechanism 92 are substantially the same as those in the first embodiment with respect to constructions, movements and functions, so that descriptions thereof are omitted herein. Further, the VGRS actuator 250 has a motor-shaft rotation locking mechanism 200 as the third-element-movement inhibiting device and the tolerance ring 207. That is, the VGRS actuator 250 has the third-element-movement allowing mechanism configured to allow the rotation of the motor shaft 152 even in a case in which the rotation of the motor shaft 152 is inhibited by the locking mechanism 200, and also the third-element-movement inhibition cancelling device constructed to include the third-element-movement allowing mechanism. Since the constructions of the locking mechanism 200 and the tolerance ring 207 are substantially the same as those in the first embodiment, descriptions thereof are omitted.

The VGRS actuator 250 has three resolvers 330, 332, 334 in addition to the above-described resolver 164. The resolver 330 is disposed between the input shaft 254 and an inner surface of the housing 252, and is capable of detecting a rotational angular position of the input shaft 254. The resolver 332 is disposed between a lower portion of the main shaft 280 constituting the output shaft 256 and the inner surface of the housing 252, and is capable of detecting a rotational angular position of the main shaft 280. The resolver 334 is disposed between the pinion shaft 282 constituting the output shaft 256 and the inner surface of the housing 252, and is capable of detecting a rotational angular position of the pinion shaft 282. It is therefore possible to detect an amount of a relative rotational displacement of the main shaft 280 and the pinion shaft 282, from detection signals supplied from the resolvers 332, 334, so that the resolvers 332, 334 function as the operating force detector that is configured to detect the operating force applied to the steering wheel 20 based on the relative rotational displacement amount. That is, the present VGRS actuator 250 has the operating force detector built therein, and the operating force detector is constructed to include the deformable member in the form of the torsion bar 284 that is disposed between the wheel turning device 12 and the driven gear 182 constituting the second element, and the deformation amount sensor configured to detect an amount of twisting deformation of the torsion bar 284.

Further, from the detection signals supplied from the resolvers 330, 332 or from the detection signals supplied from the resolvers 330, 334, it is possible to detect a difference or ratio between the rotational angle of the input shaft 254 and the rotational angle of the pinion shaft 282. Like in the first embodiment, an outcome of the detection made by the resolvers is utilized in the determination of the amount of the assisting force and the rotational direction of the wave generator 186 and also in the control of the rotation ratio between the input shaft 254 and the output shaft 256. Further, from the detection signals supplied from the resolvers 330, 332, it is possible to detect a relative rotational angle of the stator gear 180 and the driven gear 182 as the amount of the relative movement of the first and second elements. Thus, the present steering system is arranged to have the relative-movement amount detector configured to detect the amount of the relative movement of the first and second elements.

(B) Controls of Steering System

The controls executed during either the normal state or failure state in the steering system of the present embodiment is substantially the same as those of the above-described first embodiment, except for some parts only which will be described.

In the VGRS actuator 14 in the first embodiment, the torsion bar 114 is provided in the input shaft 82. On the other hand, in the VGRS actuator 250 in the present embodiment, the torsion bar 284 is provided in the output shaft 256. That is, the operating force detector is provided for the output shaft 256. Therefore, in a state in which the rotation of the motor shaft 152 is inhibited by the locking mechanism 200 in the relative-rotation disabled state, i.e., in a state in which the deadlock occurs in the movement-amount variably transmitting mechanism 92, the torsion bar 114 is not twisted even when a large amount of the operating force is applied to the steering wheel 20. Therefore, the operating force cannot be detected by the above-described operating force detector. In view of this, in the controls executed in the steering system of the present embodiment, the determination regarding the second condition (S23 in the flow chart of FIG. 8) is not performed, and the second failure control based on the determination regarding the second condition is not executed. Thus, in the steering system of the present embodiment, there is not exists the operating-force-basis releasing control portion B232 (see FIG. 9) as the functional force included in the ECU 15 of the system of the above-described embodiment.

Further, in the controls executed in the steering system of the present embodiment, when the determination regarding the third condition is performed, the rotational amount $\Delta\theta_S$ of the stator gear 180 is recognized based on the detected value detected by the resolver 330, and the rotational amount $\Delta\theta_D$ of the driven gear 182 is recognized based on the detected value detected by the resolver 332.

Third Embodiment

A steering system of the third embodiment has the same construction as the steering system of the second embodiment. However, the steering system of the third embodiment is different from the steering system of the second embodiment with respect to controls, specifically, controls related to VGRS actuator 250 and the assisting mechanism 52 of the wheel turning device 12.

Regarding the controls related to the VGRS actuator 250, the first failure control, i.e., the control for coping with the disconnection and overloading of the motor 150 is executed as in the first and second embodiments, but the second failure control, i.e., the control for coping with the relative-rotation disabled state, in which the stator gear 180 and the driven gear 182 are disabled from being rotated relative to each other due to sticking of the elements, is executed in a different manner. In the present embodiment, the second failure control is executed not only after execution of the first failure control but also without execution of the first failure control when the relative-rotation disabled state is recognized.

Described in detail, when the second failure control is executed after execution of the first failure control, the motor 150 is simply placed in the above-described motor free state, without releasing the locking of the motor shaft 152, which has been made in the first failure control. When the second failure control is executed without execution of the first failure control, the motor 150 is placed in the motor free state and the motor shaft 152 is locked by the locking mechanism 200, for example, for purpose of preventing overloading of the motor 150.

Since the second failure control is executed as described above, the rotation of the motor shaft 152 is inhibited by the locking mechanism 200 during the execution of the second failure control. However, owing the provision of the above-described tolerance ring 207, when the amount of the movement force acting on the motor shaft 152 exceeds the amount of the frictional force of the tolerance ring 207, the rotation of the motor shaft 152 is allowed. Owing to the function of this tolerance ring 207, i.e., owing to the function of the third-element-movement allowing mechanism, even in the case in which the motor shaft 152 is locked by the locking mechanism 200 during the relative-rotation disabled state, the wheel can be turned in a state in which the stator gear 180 and the driven gear 182 are integral with each other, i.e., in a state of the transmission ratio of 1:1, without a deadlock occurring in the movement-amount variably transmitting mechanism 92.

However, during the relative-rotation disabled state, the steering operation has to be performed with application of a sufficiently large amount of the operating force that enables the movement force acting on the motor shaft 152 to overcome the frictional force generated by the tolerance ring 207. Therefore, a large burden is imposed on the vehicle operator. With this taken into account, in the present embodiment, during the execution of the second failure control, the assisting-force increasing control is executed for increasing the assisting force by the assisting mechanism 52.

Figure 11:
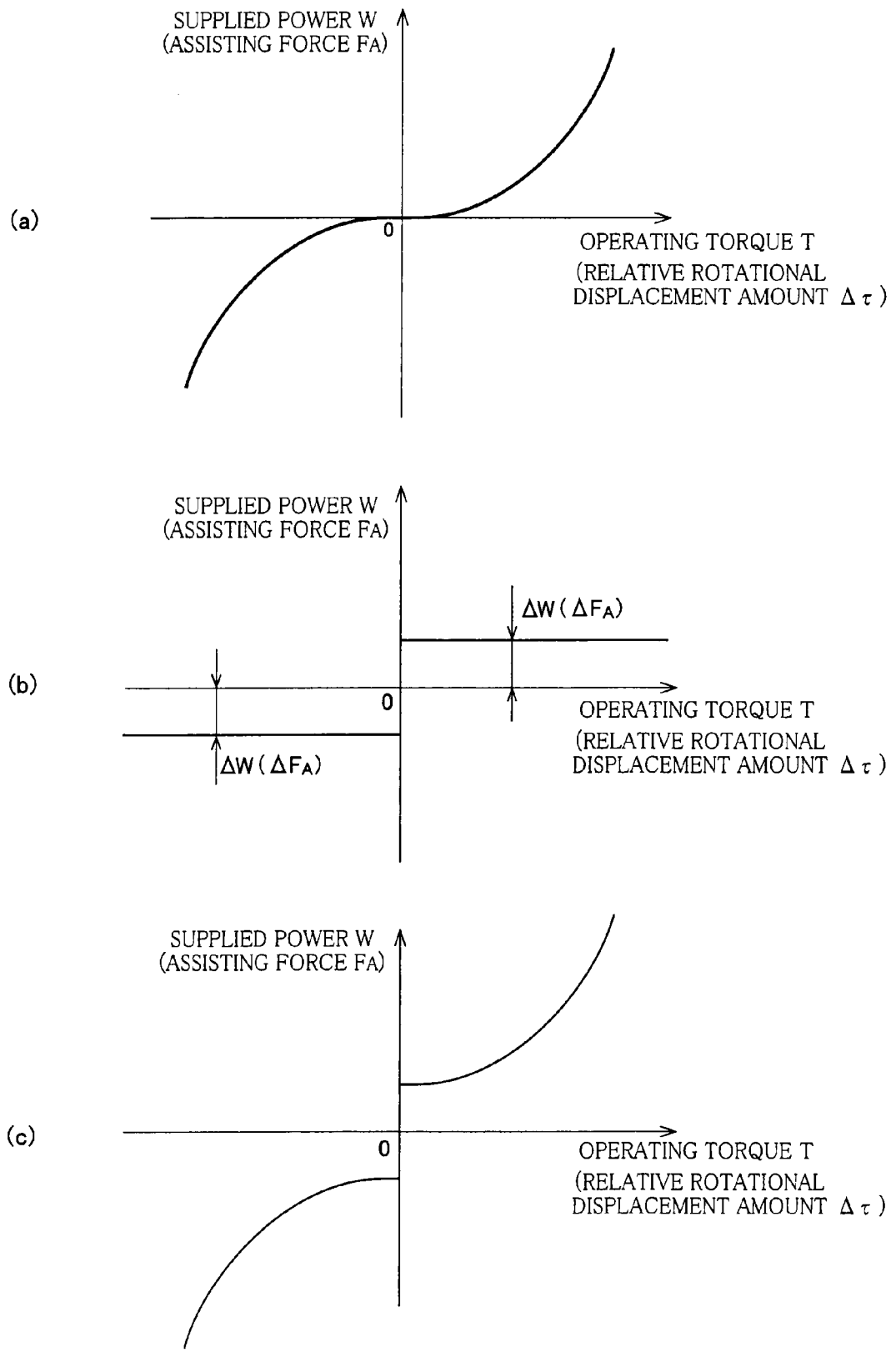
FIG. 11 is a graph showing a concept of an assisting-force increasing control executed in the vehicle steering system of the second embodiment.

During the normal state, the assisting mechanism 52 is caused to generate the assisting force $F_A$ as shown in FIG. 11 (a). On the other hand, during the execution of the assisting-force increasing control, an assisting force $\Delta F_A$ is additionally generated as shown in FIG. 11 (b). That is, there is added the assisting force $\Delta F_A$ corresponding to the frictional force so that the movement force that precisely offsets the frictional force acts on the motor shaft 162. Therefore, as shown in FIG. 11 (c), during the execution of the assisting-force increasing control, the assisting force $F_A$ is generated by the assisting mechanism 52 by an amount that is larger than in the normal state. The added assisting force $\Delta F_A$ is transmitted to the motor shaft 152 via the output shaft 256 and the driven gear 182, and serves as a force acting against the frictional force generated by the tolerance ring 207. Consequently, the wheel turning can be made, theorically, by the same amount of the operating force as that applied to the steering wheel 20 in the normal state. Thus, in the present embodiment, the burden imposed on the vehicle operator is alleviated during the relative-movement disabled state, by increasing the assisting force generated by the assisting mechanism 52. Since the assisting force $F_A$ is controlled by controlling the supplied electric power W supplied to the electric motor of the assisting mechanism 52, as described above, the supplied electric power is increased by an electric power amount $\Delta W$ that corresponds to the added assisting force $\Delta F_A$ for increasing the assisting force in the actual execution of the assisting-force increasing control.

Figure 12:
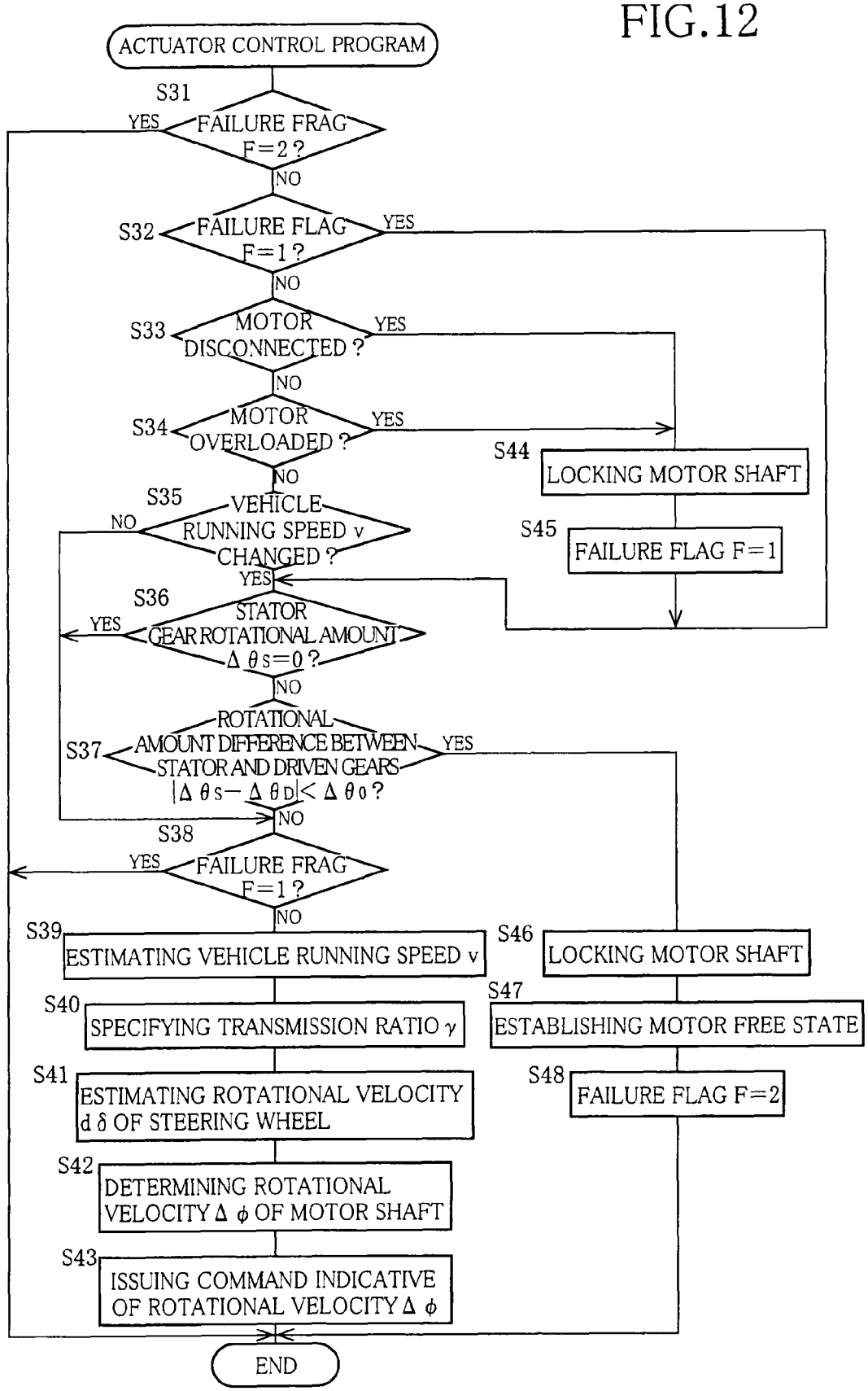
FIG. 12 is a flow chart of an actuator control program executed in the vehicle steering system of the second embodiment.

In the steering system of the present embodiment, the actuator control is executed according to the actuator control program shown in FIG. 12. Like in the control executed in the above-described embodiments, in procedures according to this program, S33 and S34 are implemented to determine whether the motor is disconnected or overloaded. When the motor is either disconnected or overloaded, S44 and S45 are implemented whereby the first failure control is initiated so that the motor shaft 152 is locked by the locking mechanism 200 and the failure flag F is set to 1 (one). When the motor is neither disconnected nor overloaded, S35 through S37 are implemented to perform determinations. These determinations are substantially the same as the determination regarding the third condition in the above-described embodiments, and it is determined, when the stator gear 180 is being rotated, whether the difference between the rotational amount $\Delta\theta_S$ of the stator gear 180 and the rotational amount $\Delta\theta_D$ of the driven gear 182 is smaller than the predetermined threshold $\Delta\theta_0$ or not, namely, whether the transmitting mechanism 92 is placed in the relative-rotation disabled state or not. However, S35 is implemented to determine whether the vehicle running speed v is being changed or not, so that S36 and S37 are implemented to perform the determination regarding the relative-rotation disabled state, upon satisfaction of a condition that the vehicle running speed v is being changed. When the first failure control is not executed, S39 through S43 are implemented to execute the transmission ratio control. Therefore, the above-described condition is provided for assuring an accurate recognition of the relative-rotation disabled state.

When the transmitting mechanism 92 is placed in the relative-rotation disabled state, S46 through S48 are implemented to initiate the second failure control, so that the motor shaft 152 is locked by the locking mechanism 200, the motor 150 is placed in the above-described motor free state, and the failure flag is set to 2 (two). When the transmitting mechanism 92 is not placed in the relative-rotation disabled state, S39 through S43 are implemented to carry out procedures for the transmission ratio control in the same manner as in the above-described embodiments.

Once after the first failure control has been initiated, the determinations made in S36 and S37, i.e., the determination regarding the relative-rotation disabled state is handled by the determination performed in S32. In S32, since the determination is performed in a state in which the locking of the motor shaft 152 is maintained, it is performed by utilizing the play 240 between the distal end portion 210 of the lock lever 206 and each recessed portion 214 of the lock holder 208, as described above. When the transmitting mechanism 92 is placed in the relative-rotation disabled state, the second failure control is initiated by implementations of S46 and steps following S46. When the transmitting mechanism 92 is not placed in the relative-rotation disabled state, the execution of the first failure control is continued. Once after the second failure control has been initiated, it is continued depending on the determination of S31.

Figure 13:
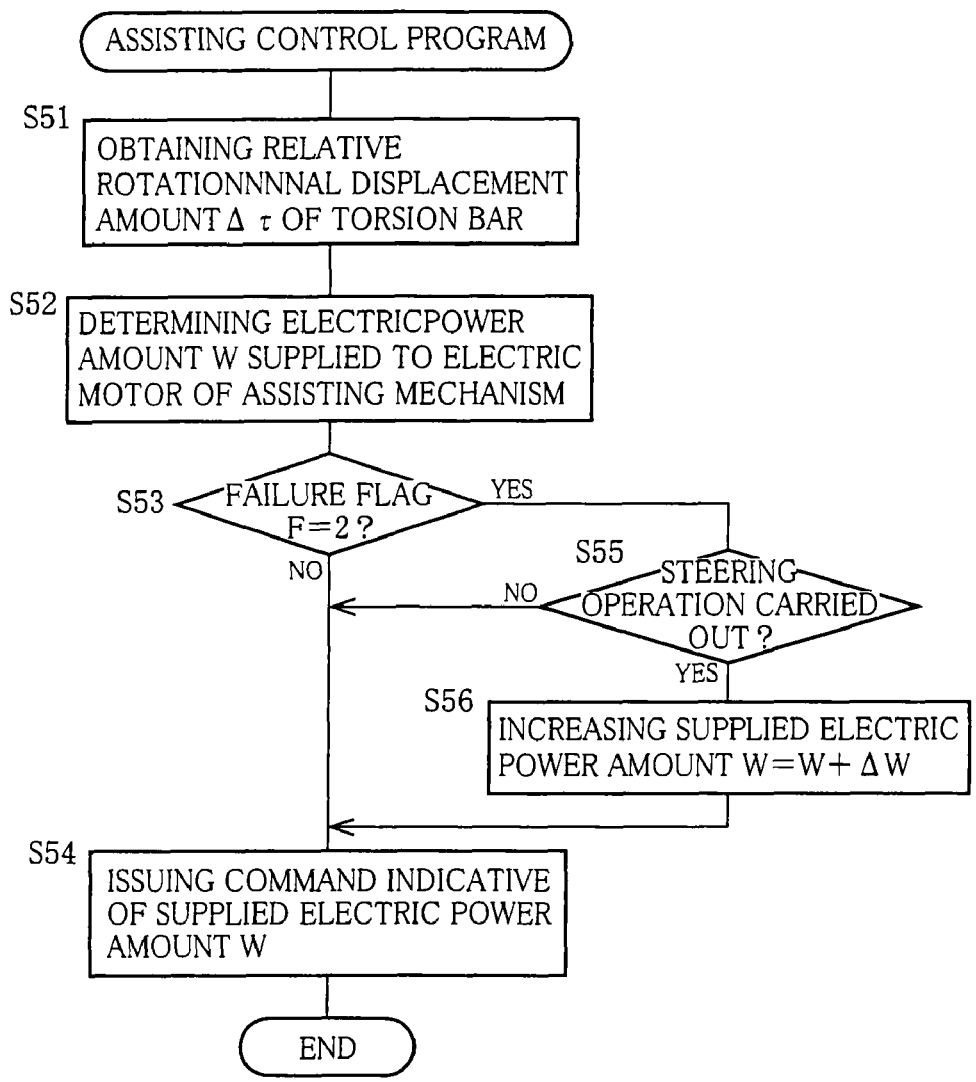
FIG. 13 is a flow chart of an assisting control program executed in the vehicle steering system of the second embodiment.

Further, in the present steering system according to the present embodiment, the assisting control is executed according to the assisting control program shown in FIG. 13. In this control, S53 is implemented to make the determination utilizing the failure flag F, i.e., the determination as to whether the transmitting mechanism 92 is placed in the relative-rotation disabled state or not. When the transmitting mechanism 92 is not placed in the relative-rotation disabled state, the wheel turning force is assisted in the same manner as in the first and second embodiments. When the transmitting mechanism 92 is placed in the relative-rotation disabled state, S55 is implemented to determine whether the steering operation is being carried out or not. Only when the steering operation is being carried out, S56 is implemented to increase the electric power W supplied to the electric motor of the assisting mechanism 52 so as to increase the assisting force, as described above. It is noted that the determination as to whether the steering operation is being carried out or not is made based on a slight change of the rotational angle of the steering wheel 20 that is detected by the operation angle sensor 28, and that the direction of the steering operation is also specified base on the change when it is recognized that the steering operation is being carried out.

Figure 14:
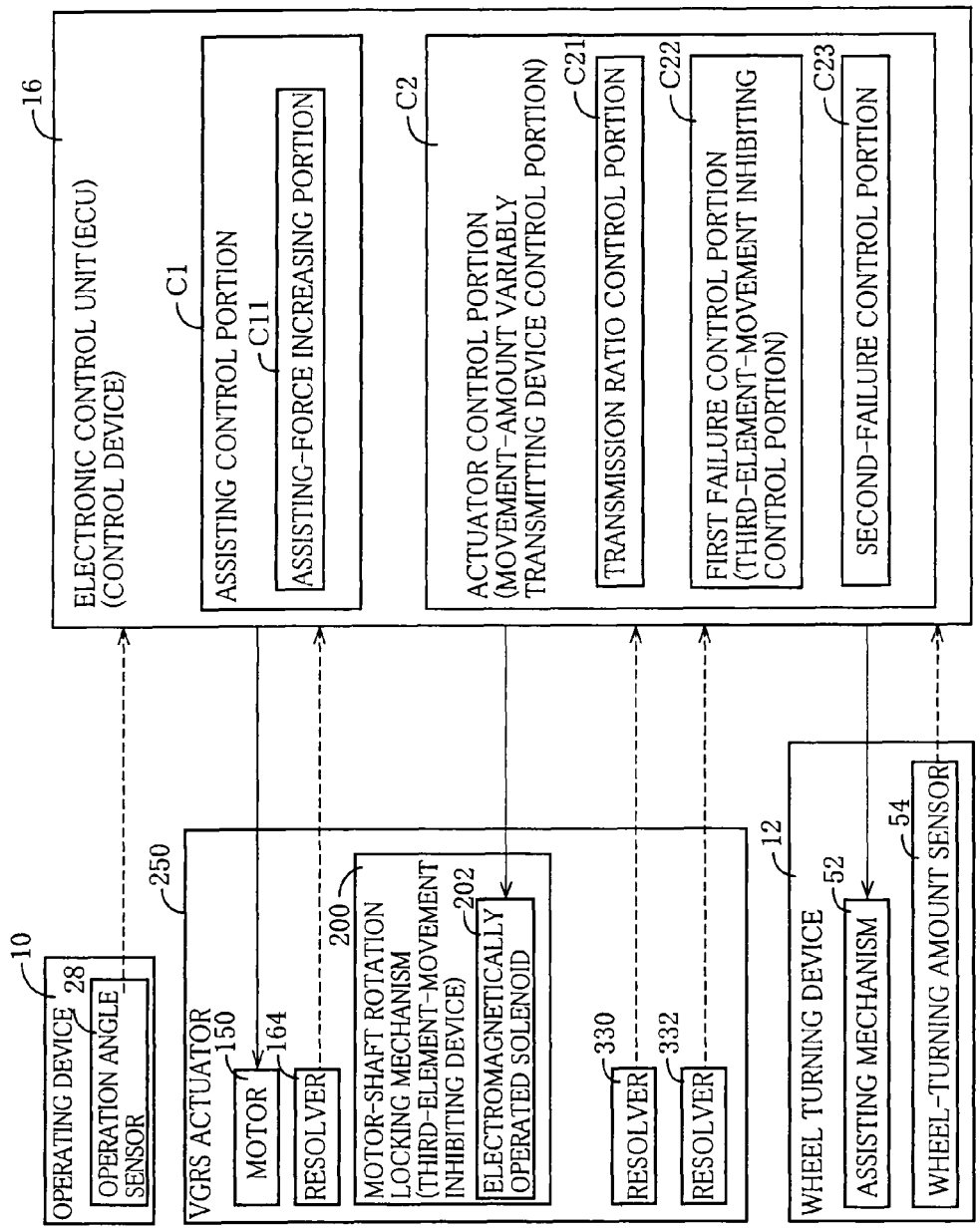
FIG. 14 is a functional block diagram of a control device provided in the vehicle steering system of the second embodiment.

The ECU 16, which is configured to perform procedures according to the above-described actuator control program and assisting control program, can be considered to have functional constructions as shown in FIG. 14. Described in detail, the ECU 16 has an assisting control portion C1 configured to perform procedures according to the assisting control program. This assisting control portion C1 has a functional portion configured to procedures of S55, S56 depending on a determination of S53, namely, an assisting-force increasing portion C11 configured to increase the assisting force by operation of the assisting mechanism 52 in the relative-rotation disabled state.

Further, the ECU 16 has an actuator control portion C2 as the movement-amount variably transmitting device control portion configured to perform procedures according to the actuator control program. Like in the system of the above-described embodiments, the actuator control portion C2 has a transmission ratio control portion C21 and a first failure control portion C22 as the third-element-movement inhibiting control portion. The actuator control portion C2 further has a second failure control portion C23 as a functional portion configured to perform procedures of S46 through S48 depending on the detection of the relative-rotation disabled state.

Although the steering system of the present embodiment is a system having the constructions as described above, it can be modified as follows. For example, while the present system employs the VGRS actuator 250 as in the second embodiment, it can employ also the VGRS actuator 14 as in the first embodiment. In the VGRS actuator 14, the torsion bar 114 is disposed between the stator gear 180 and the steering wheel 20. It might be considered that the operating force has to be made large due to the frictional force of the tolerance ring 207 during the execution of the second failure control. However, in the case of the employment of the VGRS actuator 14, the amount of twisting deformation of the torsion bar 114 is increased as a result of the increase of the operating force, because of the position of provision of the torsion bar 114. Consequently, where the VGRS actuator 14 is employed, it is possible to expect that the assisting force can be increased by a certain degree even without relying on the assisting-force increasing control. Therefore, where the VGRS actuator 14 is employed, the merit provided by the assisting-force increasing control is smaller than where the VGRS actuator 250 is employed as in the second embodiment.

In the above-described system, the assisting force $\Delta F_A$ is added such that the movement force precisely offsetting the frictional force generated by the tolerance ring 207 acts on the motor shaft 152 in the execution of the assisting-force increasing control. However, in place of adding such an amount of the assisting force $\Delta F_A$, a different amount of the assisting force $\Delta F_A$ may be added such that the movement force offsetting some percentage of the frictional force acts on the motor shaft 152.

In the above-described system, as the determination made prior to the initiation of the execution of the second failure control during the execution of the first failure control, only the determination substantially the same as the determination regarding the third condition in the above-described embodiments is performed, namely, only the determination based on the difference between the rotational amount $\Delta\theta S$ of the stator gear 180 and the rotational amount $\Delta\theta D$ of the driven gear 182 is performed. However, in addition to or in place of such a determination, the determination regarding the first condition in the above-described embodiment, i.e., the determination based on the acting force acting on the locking mechanism 200 may be performed so that the second failure control is executed depending on an outcome of this determination.

The invention claimed is:
1. A steering system for a vehicle, comprising:
 (a) a steering operation member operable by an operator of the vehicle;
 (b) a movement-amount variably transmitting device including: (b-1) a housing fixed to a body of the vehicle; (b-2) a differential mechanism including (i) a first element movably disposed in said housing and connected to said steering operation member so as to be moved by an amount corresponding to an operating amount of said steering operation member, (ii) a second element disposed in said housing and movable relative to said first element, and (iii) a third element engaged with said first and second elements; and (b-3) a drive source fixed to said housing and configured to move said third element, such that an amount of a relative movement of said first and second elements is changeable depending on an amount of a movement of said third element; and (c) a wheel turning device connected to said second element so as to turn a wheel of the vehicle by a wheel turning amount corresponding to an amount of movement of said second element, wherein said movement-amount variably transmitting device further includes (b-4) a third-element-movement inhibiting device configured to inhibit the movement of said third element, wherein said steering system further includes (d) a third-element-movement inhibition cancelling device configured to cancel inhibition of the movement of said third element, which is made by said third-element-movement inhibiting device, wherein said movement-amount variably transmitting device further includes a third-element-movement allowing mechanism configured to allow the movement of said third element when an amount of a movement force forcing said third element to be moved becomes larger than a threshold upon the inhibition of the movement of said third element, which is made by said third-element-movement inhibiting device, and wherein said third-element-movement inhibition cancelling device includes said third-element-movement allowing mechanism.

2. The steering system according to claim 1,
wherein said third-element-movement inhibiting device includes an engaged portion which is held in frictional engagement with said third element and an engaging portion which is provided in said housing and which is engageable with said engaged portion, such that the movement of said third element is inhibited by engagement of said engaging portion with said engaged portion, and wherein said third-element-movement allowing mechanism is configured to allow the movement of said third element when the movement force overcomes a frictional force acting between said third element and said engaged portion.

3. The steering system according to claim 2,
wherein said third element is rotatable,
wherein said engaged portion is provided in a rotatable member that is rotatable relative to said third element,
and wherein said third-element-movement allowing mechanism includes a tolerance ring interposed between said rotatable member and said third element.

4. The steering system according to claim 1, further comprising:
an assisting mechanism configured to generate an assisting force that assists a wheel turning force for turning the wheel; and
a control device configured to control said assisting mechanism,
wherein said control device is configured to execute an assisting control for controlling the assisting force generated by said assisting mechanism, based on an operating force applied to said steering operation member, and to execute an assisting-force increasing control for increasing the assisting force in a state in which the movement of said third element is inhibited by said third-element-movement inhibiting device while said first element and said second element are disabled from being moved relative to each other.

5. The steering system according to claim 4, further comprising:
a relative-movement amount detector configured to detect the amount of the relative movement of said first and second elements,
wherein said control device is configured to execute the assisting-force increasing control, based on the amount of the relative movement detected by said relative-movement amount detector.

6. The steering system according to claim 4,
wherein said third-element-movement inhibiting device includes an engaged portion which is held in frictional engagement with said third element and an engaging portion which is provided in said housing and which is engageable with said engaged portion, such that the movement of said third element is inhibited by engagement of said engaging portion with said engaged portion,
wherein said third-element-movement allowing mechanism is configured to allow the movement of said third element when the movement force overcomes a frictional force acting between said third element and said engaged portion,
and wherein said assisting-force increasing control is executed to increase the assisting force generated in the assisting control, based on the frictional force.

7. The steering system according to claim 1, further comprising:
a control device configured to control said third-element-movement inhibiting device so as to execute a third-element-movement inhibiting control for inhibiting the movement of said third element,
wherein said third-element-movement inhibition cancelling device includes a portion of said control device that is configured, in a relative-movement disabled state in which said first element and said second element are disabled from being moved relative to each other, to execute a third-element-movement non-inhibiting-state establishing control for controlling said third-element-movement inhibiting device so as to establish a state in which the movement of said third element is not inhibited.

8. The steering system according to claim 7,
wherein said control device is configured to execute the third-element-movement inhibiting control in event of failure of said movement-amount variably transmitting device that disenables said drive source from moving said third element.

9. The steering system according to claim 7, further comprising:
a relative-movement amount detector configured to detect the amount of the relative movement of said first element and said second element,
wherein said portion of said control device is configured to execute the third-element-movement non-inhibiting-state establishing control, based on the amount of the relative movement detected by said relative-movement amount detector.

10. The steering system according to claim 7,
wherein said portion of said control device is configured, when the movement of said third element is inhibited by said third-element-movement inhibiting device in the relative-movement disabled state in which said first element and said second element are disabled from being moved relative to each other, to execute the third-element-movement non-inhibiting-state establishing control, by executing a third-element-movement inhibition releasing control for releasing the inhibition of the movement of said third element by controlling said third-element-movement inhibiting device.

11. The steering system according to claim 10,
wherein said third-element-movement inhibiting device includes an engaged portion which is provided in said third element and an engaging portion which is provided on said housing and which is engageable with said engaged portion, such that the movement of said third element is inhibited by engagement of said engaging portion with said engaged portion,
wherein said movement-amount variably transmitting device includes an acting force detector that is configured to detect an acting force acting between said engaged portion and said engaged portion during the engagement,
and wherein said portion of said control device is configured to execute the third-element-movement inhibition releasing control, when an amount of the acting force detected by said acting force detector becomes larger than a threshold.

12. The steering system according to claim 10,
wherein said portion of said control device is configured to execute the third-element-movement inhibition releasing control, when an amount of an operating force applied to said steering operation member becomes larger than a threshold.

13. The steering system according to claim 10, further comprising:
a relative-movement amount detector configured to detect the amount of the relative movement of said first element and said second element,
wherein said third-element-movement inhibiting device is configured to allow the movement of said third element by an amount within a threshold range and to inhibit the movement of said third element by an amount exceeding the threshold range,
and wherein said portion of said control device is configured to execute the third-element-movement inhibition releasing control, based on the amount of the relative movement detected by said relative-movement amount detector, when said first and second elements are disabled from being moved relative to each other, with said third element being allowed to be moved by the amount within the threshold range.

14. The steering system according to claim 1,
wherein said first element and said second element are rotatable, and include respective circular splines having respective numbers of teeth that are different from each other,
wherein said third element includes a flexspline which meshes with said circular splines and a wave generator which is fitted in said flexspline and which is rotatable by a motor as said drive source,
and wherein said movement-amount variably transmitting device includes a harmonic gear mechanism that is constituted by said circular splines, said flexspline and said wave generator.

15. The steering system according to claim 1, further comprising:
a lock holder provided at an outer periphery of the third element, and
a lock lever pivotally provided in the third-element-movement inhibiting device such that when the lock lever is pivoted toward the lock holder, a distal end of the lock lever engages with a recessed portion of the lock holder.

16. The steering system according to claim 15, further comprising:
a spring that biases the lock lever toward the lock holder,
a solenoid that pivots the lock lever away from the lock holder when the solenoid is energized, and
wherein the third-element-movement inhibition cancelling device includes a control device that controls the solenoid.

17. A steering system for a vehicle, comprising:
(a) a steering operation member operable by an operator of the vehicle;
(b) a movement-amount variably transmitting device including: (b-1) a housing fixed to a body of the vehicle; (b-2) a differential mechanism including (i) a first element movably disposed in said housing and connected to said steering operation member so as to be moved by an amount corresponding to an operating amount of said steering operation member, (ii) a second element disposed in said housing and movable relative to said first element, and (iii) a third element engaged with said first and second elements; (b-3) a drive source fixed to said housing and configured to move said third element, such that an amount of a relative movement of said first and second elements is changeable depending on an amount of a movement of said third element; and (b-4) a third-element-movement inhibiting device configured to inhibit the movement of said third element relative to said housing that is unmovably fixed to the body of the vehicle;
(c) a wheel turning device connected to said second element so as to turn a wheel of the vehicle by a wheel turning amount corresponding to an amount of movement of said second element;
(d) a third-element-movement inhibition cancelling device configured to cancel inhibition of the movement of said third element, which is made by said third-element-movement inhibiting device; and
a control device configured to control said third-element-movement inhibiting device so as to execute a third-element-movement inhibiting control for inhibiting the movement of said third element,
wherein said third-element-movement inhibition cancelling device includes a portion of said control device that is configured, in a relative-movement disabled state in which said first element and said second element are disabled from being moved relative to each other, to execute a third-element-movement non-inhibiting-state establishing control for controlling said third-element-movement inhibiting device so as to establish a state in which the movement of said third element is not inhibited,
wherein said portion of said control device is configured, when the movement of said third element is inhibited by said third-element-movement inhibiting device in the relative-movement disabled state in which said first element and said second element are disabled from being moved relative to each other, to execute the third-element-movement non-inhibiting-state establishing control, by executing a third-element-movement inhibition releasing control for releasing the inhibition of the movement of said third element by controlling said third-element-movement inhibiting device, and
wherein said portion of said control device is configured to execute the third-element-movement inhibition releasing control, when an amount of a movement force forcing said third element to be moved becomes larger than a threshold upon the inhibition of the movement of said third element, which is made by said third-element-movement inhibiting device.

18. A steering system for a vehicle, comprising:
(a) a steering operation member operable by an operator of the vehicle;
(b) a movement-amount variably transmitting device including: (b-1) a housing fixed to a body of the vehicle; (b-2) a differential mechanism including (i) a first element movably disposed in said housing and connected to said steering operation member so as to be moved by an amount corresponding to an operating amount of said steering operation member, (ii) a second element disposed in said housing and movable relative to said first element, and (iii) a third element engaged with said first and second elements; (b-3) a drive source fixed to said housing and configured to move said third element, such that an amount of a relative movement of said first and second elements is changeable depending on an amount of a movement of said third element; and (b-4) a third-element-movement inhibiting device configured to inhibit the movement of said third element relative to said housing that is unmovably fixed to the body of the vehicle;
(c) a wheel turning device connected to said second element so as to turn a wheel of the vehicle by a wheel turning amount corresponding to an amount of movement of said second element;
(d) a third-element-movement inhibition cancelling device configured to cancel inhibition of the movement of said third element, which is made by said third-element-movement inhibiting device;
a lock holder provided at an outer periphery of the third element; and
a lock lever pivotally provided in the third-element-movement inhibiting device such that when the lock lever is pivoted toward the lock holder, a distal end of the lock lever engages with a recessed portion of the lock holder, wherein
the movement-amount variably transmitting device includes a third-element-movement allowing mechanism that includes a tolerance ring interposed between the lock holder and the third element,
the tolerance ring includes a corrugated portion provided on an outer periphery of the tolerance ring that frictionally contacts an inner peripheral portion of the lock holder, and
when an amount of a movement force forcing the third element to be moved becomes larger than a threshold upon the inhibition of the movement of said third element, the tolerance ring allows rotation of the third element even in a state where the lock lever is engaged with the lock holder.

* * * * *